United States Patent
Zetterberg et al.

(10) Patent No.: US 11,743,782 B2
(45) Date of Patent: Aug. 29, 2023

(54) TECHNIQUE FOR UPDATING CELLULAR NEIGHBOR RELATIONS

(71) Applicant: Telefonaktiebolaget LM Ericsson (publ), Stockholm (SE)

(72) Inventors: Kristina Zetterberg, Linköping (SE); Pradeepa Ramachandra, Linköping (SE); Pål Frenger, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 289 days.

(21) Appl. No.: 17/056,818

(22) PCT Filed: May 24, 2018

(86) PCT No.: PCT/EP2018/063704
§ 371 (c)(1),
(2) Date: Nov. 19, 2020

(87) PCT Pub. No.: WO2019/223873
PCT Pub. Date: Nov. 28, 2019

(65) Prior Publication Data
US 2021/0160744 A1 May 27, 2021

(51) Int. Cl.
*H04W 36/00* (2009.01)

(52) U.S. Cl.
CPC ... *H04W 36/0061* (2013.01); *H04W 36/0058* (2018.08)

(58) Field of Classification Search
CPC ........... H04W 36/00835; H04W 24/10; H04W 36/0061; H04B 17/318
See application file for complete search history.

(56) References Cited

U.S. PATENT DOCUMENTS

| | | | |
|---|---|---|---|
| 2009/0191862 A1* | 7/2009 | Amirijoo | H04W 36/0083 455/424 |
| 2012/0106370 A1* | 5/2012 | Radulescu | H04W 24/10 370/252 |

(Continued)

FOREIGN PATENT DOCUMENTS

| | | |
|---|---|---|
| WO | 2018 038653 A1 | 3/2018 |
| WO | 2018 186783 A1 | 10/2018 |

OTHER PUBLICATIONS

3GPP TS 38.331 v15.1.0; Technical Specification; 3rd Generation Partnership Project; Technical Specification Group Radio Access Network; NR; Radio Resource Control (RRC) protocol specification (Release 15)—Mar. 2018.

(Continued)

Primary Examiner — Dung Hong
(74) Attorney, Agent, or Firm — Baker Botts L.L.P.

(57) ABSTRACT

A technique for updating a list of neighbor relations between cells (100, 312, 502, 504, 512, 514) of a radio access network, RAN, (304) is described. The cells (100, 312, 502, 504, 512, 514) of the RAN (304) comprise first cells (100, 502, 504) configured to provide radio access according to a first radio access technology, RAT, and second cells (512, 514) configured to provide radio access according to a second RAT that is different from the first RAT. As to a method aspect of the technique, each of at least two of the second cells (512, 514) of the RAN (304) is initiated to transmit a measurement signal to a radio device (310; 1391; 1392; 1430) that is served by one or more cells (100; 312) of the RAN (304) other than the at least two second cells (512, 514) of the RAN (304). A confirmation report indicative of a reception of the measurement signal at the radio device (310; 1391; 1392; 1430) is received from one second cell (512) among the at least two second cells (512, 514).

(Continued)

The list of neighbor relations is updated according to the received confirmation report.

26 Claims, 18 Drawing Sheets

(56) References Cited

U.S. PATENT DOCUMENTS

| | | | | |
|---|---|---|---|---|
| 2012/0178451 | A1* | 7/2012 | Kubota | H04W 8/00 455/436 |
| 2012/0275315 | A1* | 11/2012 | Schlangen | H04W 24/02 370/242 |
| 2014/0334320 | A1* | 11/2014 | Liu | H04L 5/0098 370/252 |
| 2017/0094591 | A1* | 3/2017 | Namboodiri | H04W 36/0072 |
| 2019/0037417 | A1* | 1/2019 | Lei | H04W 72/542 |
| 2019/0132066 | A1* | 5/2019 | Park | H04W 76/18 |
| 2020/0053608 | A1* | 2/2020 | Tao | H04W 36/0088 |
| 2020/0077312 | A1* | 3/2020 | Tsuboi | H04W 24/10 |

OTHER PUBLICATIONS

3GPP TSG-RAN WG2 #98-AdHoc; Qingdao, China; Source: Ericsson; Title: ANR for NSA NR (Tdoc R2-1707283)—Jun. 27-29, 2017.

3GPP TSG-RAN WG2 #100; Reno, Nevada, USA; Source: Huawei, HiSilicon; Title: Automatic Neighbour Relation in NR (R2-1712548 (Resubmission of R2-1710543))—Nov. 27-Dec. 1, 2017.

3GPP TSG-RAN WG2 Meeting #102; Busan, Korea; Source: vivo; Title: Report of email discussion [101bis#47][NR] ANR (R2-1807626)—May 21-25, 2018.

3GPP TSG-RAN WG3 Meeting #87bis; Tenerife, Spain; Title: Way forward on Intra LTE SON for AAS; Source: Ericsson (R3-150728)—Apr. 20-24, 2015.

3GPP TSG-RAN WG3 Meeting #97bis; Prague, Czech Republic; Source: Nokia, Nokia Shanghai Bell; Title: Information for EN-DC X2 setup and configuration update (R3-173751)—Oct. 9-13, 2017.

PCT International Search Report issued for International application No. PCT/EP2018/063704—dated Aug. 8, 2018.

PCT Written Opinion of the International Searching Authority issued for International application No. PCT/EP2018/063704—dated Aug. 8, 2018.

3GPP TSG-RAN WG3 Meeting #97bis; Prague, Czech Republic; Source: Ericsson; Title: On X2 TNL Address discovery for option 3 (R3-173935)—Oct. 9-13, 2017.

Communication Pursuant to Article 94(3) EPC issued for Application No. 18 728 822.0-1218—dated May 2, 2022.

\* cited by examiner

100

Measurement Signal Module — 102

Confirmation Report Module — 104

Neighbor Relation Module — 106

In a RAN comprising first cells and second cells, initiate each of at least two of the second cells to transmit a measurement signal to a radio device that is served by one or more cells of the RAN other than the at least two second cells — 202

Receive a confirmation report indicative of a reception of the measurement signal at the radio device from one second cell among the at least two second cells — 204

Update the list of neighbor relations according to the received confirmation report — 206

Fig. 2

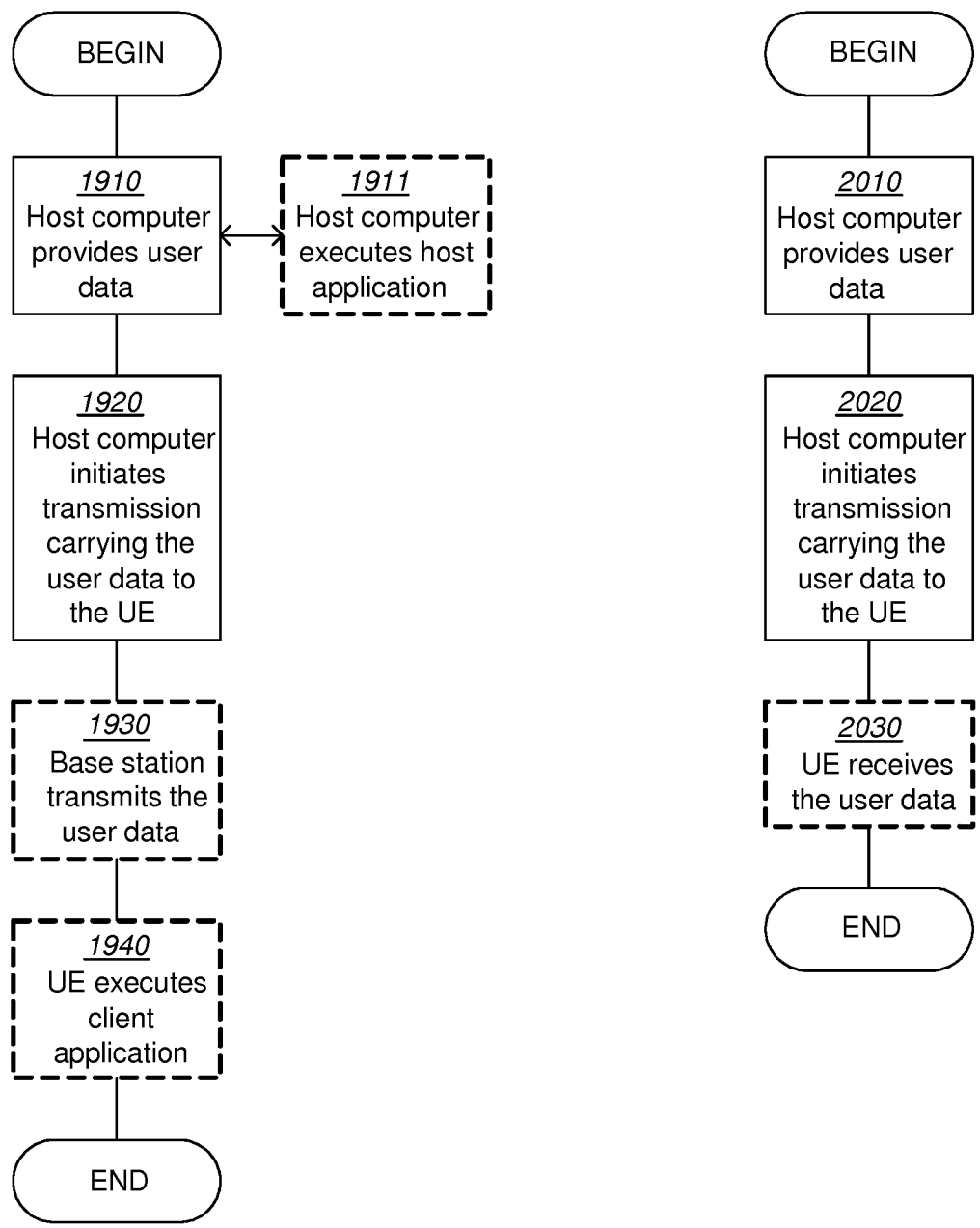

TECHNIQUE FOR UPDATING CELLULAR NEIGHBOR RELATIONS

PRIORITY

This nonprovisional application is a U.S. National Stage Filing under 35 U.S.C. § 371 of International Patent Application Serial No. PCT/EP2018/063704 filed May 24, 2018 and entitled "Technique for Updating Cellular Neighbor Relations" which is hereby incorporated by reference in its entirety.

TECHNICAL FIELD

The present disclosure generally relates to a technique for updating cellular neighbor relations. More specifically, a method and a device are provided for updating a list of such neighbor relations in a radio access network comprising cells for different radio access technologies.

BACKGROUND

A cellular radio access network (RAN) comprises multiple cells providing radio access to one or more radio devices. Knowledge of neighbor relations among these cells is important inter alia for handover procedures and multi-connectivity involving neighboring cells. Herein, updating Automatic Neighbor Relations (ANRs) in a cellular radio access network (RAN), including initially determining ANRs, is referred to as an ANR function. The ANR function can remove, or significantly decrease, the manual configuration work done by operators for setting up neighbor relations within the cellular RAN. Furthermore, the neighbor relations may be updated as a consequence of structural or seasonal changes.

With the introduction of Long Term Evolution (LTE) by the Third Generation Partnership Project (3GPP), support for an ANR function was introduced according to the document 3GPP TS 32.511 since version 8.0.0 and more recently in version 14.2.0. The ANR function in LTE relies on the always-on transmission of System Information (SI) from each of the cells of the RAN. The SI enables a 3GPP radio device, i.e., a user equipment (UE), to retrieve an Enhanced Cell Global Identity (ECGI) of any unknown neighbor cell as part of the conventional ANR function.

Thus, the conventional ANR function (e.g. for 3GPP LTE) relies on radio device measurements of a global cell identifier, which is transmitted in the cell-specific SI from each cell of the RAN. However, in a RAN providing multiple radio access technologies (RATs), wherein a first RAT provides a backbone for a second RAT, the cells of the second RAT do not need to transmit cell-specific SI. As a consequence, the radio device may be unable to identify neighboring cells of the second RAT by reporting SI measurements.

Furthermore, the cells of the second RAT may transmit synchronization signals that locally distinguish the cells of the second RAT in terms of physical cell identifiers (PCIs) of the second RAT, but the PCIs of the second RAT may be ambiguous from the perspective of one or more cells of the first RAT. Hence, in a PCI-based ANR function that is based on a PCI of the second RAT reported by the radio device, a cell of the first RAT serving the reporting radio device may be unable to resolve or even detect the PCI ambiguity, which is also referred to as a PCI conflict. The PCI conflict thus excludes using the PCI-based ANR function or can lead to incorrect entries in the list of neighbor relations.

By way of example, in at least some non-standalone (NSA) deployments of 3GPP New Radio (NR), the NR cells do not transmit their NR SI, because an existing LTE network provides the backbone for the NR cells. In these cases, the UE is not able to read any NR global identifiers. This means that the conventional ANR function used in 3GPP LTE is not usable for automatic NSA NR neighbor relation establishment and an NR PCI-based ANR function is susceptible to PCI conflicts.

SUMMARY

Accordingly, there is a need for a technique that allows automatic updates of neighbor relations in a network comprising cells for different radio access technologies, e.g., wherein one radio access technology provides a backbone for another radio access technology.

As to a method aspect, a method of updating a list of neighbor relations between cells of a radio access network (RAN) is provided. The cells of the RAN may comprise first cells configured to provide radio access according to a first radio access technology (RAT) and second cells configured to provide radio access according to a second RAT that is different from the first RAT. The method may comprise a step of initiating each of at least two of the second cells of the RAN to transmit a measurement signal to a radio device that is served by one or more cells of the RAN other than the at least two second cells of the RAN. The method may comprise a step of receiving a confirmation report indicative of a reception of the measurement signal at the radio device from one second cell among the at least two second cells. The method may comprise a step of updating the list of neighbor relations according to the received confirmation report.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the RAN, via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for updating a list of neighbor relations between cells of a radio access network (RAN) is provided. The cells of the RAN may comprise first cells configured to provide radio access according to a first radio access technology (RAT) and second cells configured to provide radio access according to a second RAT that is different from the first RAT. The device may be configured to perform the method aspect. Alternatively or in addition, the device may comprise an initiating unit configured to initiate each of at least two of the second cells of the RAN to transmit a measurement signal to a radio device that is served by one or more cells of the RAN other than the at least two second cells of the RAN. The device may further comprise a receiving unit configured to receive a confirmation report indicative of a reception of the measurement signal at the radio device from one second cell among the at least two second cells. The device may further comprise an updating unit configured to update the list of neighbor relations according to the received confirmation report.

As to another device aspect, a device for updating a list of neighbor relations between cells of a radio access network (RAN) is provided. The cells of the RAN may comprise first cells configured to provide radio access according to a first radio access technology (RAT) and second cells configured to provide radio access according to a second RAT that is different from the first RAT. The device comprises at least one processor and a memory. Said memory may comprise instructions executable by said at least one processor whereby the device is operative to initiate each of at least two of the second cells of the RAN to transmit a measurement signal to a radio device that is served by one or more cells of the RAN other than the at least two second cells of the RAN. Execution of the instructions may further cause the device to be operative to receive a confirmation report indicative of a reception of the measurement signal at the radio device from one second cell among the at least two second cells. Execution of the instructions may further cause the device to be operative to update the list of neighbor relations according to the received confirmation report.

As to a further aspect, a base station configured to communicate with a radio device (e.g., a user equipment or UE) is provided. The base station may comprise a radio interface (e.g., according to the first RAT), a backbone interface (e.g., according to the 3GPP X2 interface or 3GPP Xn interface) and/or processing circuitry configured to execute any one of the steps of the method aspect.

As to a still further aspect a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect a method implemented in a base station is provided. The method may comprise any of the steps of the method aspect.

The device, the base station, the communication system or any node or station for embodying the technique may further include any feature disclosed in the context of the method aspect, and vice versa. Particularly, any one of the units and modules, or a dedicated unit or module, may be configured to perform or trigger one or more of the steps of the method aspect.

BRIEF DESCRIPTION OF THE DRAWINGS

Further details of embodiments of the technique are described with reference to the enclosed drawings, wherein:

FIG. 1 shows a schematic block diagram of an embodiment of a device for updating a list of neighbor relations between cells of a radio access network;

FIG. 2 shows a flowchart for an implementation of a method of updating a list of neighbor relations between cells of a radio access network, which method may be implementable by the device of FIG. 1;

FIGS. 19 and 20 show flowcharts for methods implemented in a communication system including a host computer, a base station and a user equipment.

DETAILED DESCRIPTION

Figure 3:
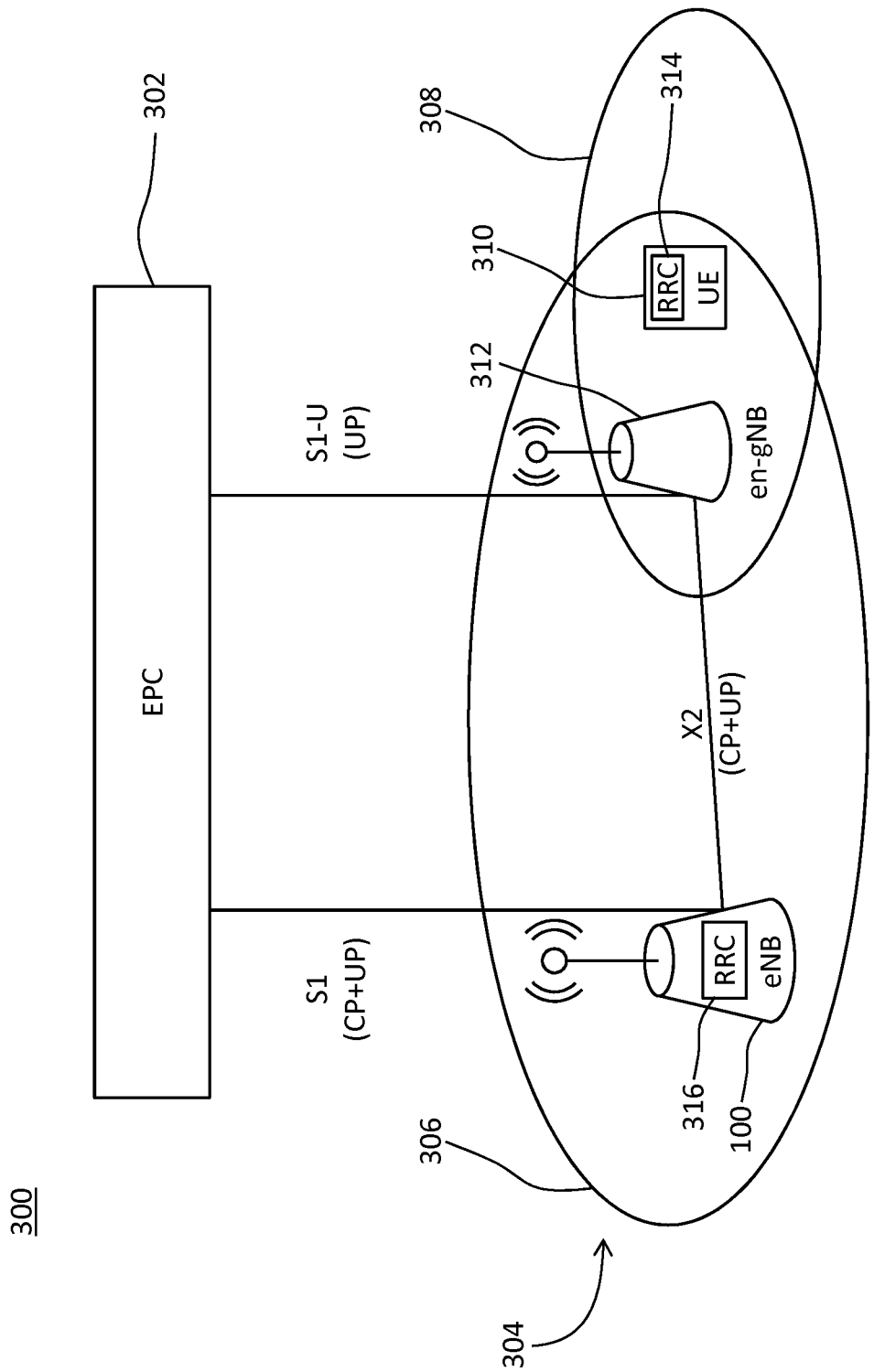
FIG. 3 schematically illustrates a first exemplary network deployment for implementing the device of FIG. 1 and the method of FIG. 2.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof and/or Wireless Local Area Network (WLAN) according to the standard family IEEE 802.11 (Wi-Fi).

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

FIG. 1 schematically illustrates a block diagram of an embodiment of a device for updating a list of neighbor relations between cells of a radio access network (RAN). The cells of the RAN comprise first cells configured to provide radio access according to a first radio access technology (RAT) and second cells configured to provide radio access according to a second RAT that is different from the first RAT. The device is generically referred to by reference sign 100.

The embodiment of the device 100 comprises a measurement signal module 102 that initiates each of at least two of the second cells of the RAN to transmit a measurement signal to a radio device that is served by one or more cells of the RAN other than the at least two second cells of the RAN. The device 100 further comprises a confirmation module 104 that receives a confirmation report indicative of a reception of the measurement signal at the radio device from one second cell among the at least two second cells. A neighbor relation module 106 of the device 100 updates the list of neighbor relations according to the received confirmation report.

Any of the modules of the device 100 may be implemented by units configured to provide the corresponding functionality.

In one variant, the device 100 may be part of the RAN. The device 100 may be embodied by or at a base station of the RAN, nodes connected to the RAN for controlling the base station or a combination thereof. In another variant, which is combinable with the one variant, the device 100 may be part of a core network connected to the RAN. The device 100 may be embodied by or at a mobility management entity (MME) of the core network.

FIG. 2 shows a flowchart for a method 200 of updating a list of neighbor relations between cells of a radio access network (RAN). The cells of the RAN comprise first cells configured to provide radio access according to a first RAT and second cells configured to provide radio access according to a second RAT that is different from the first RAT. The method 200 comprises a step 202 of initiating each of at least two of the second cells of the RAN to transmit a measurement signal to a radio device that is served by one or more cells of the RAN other than the at least two second cells of the RAN. In a step 204 of the method 200, a confirmation report, which is indicative of a reception of the measurement signal at the radio device from one second cell among the at least two second cells, is received. The list of neighbor relations is updated according to the received confirmation report in a step 206 of the method 200.

The method 200 may be performed by the device 100, e.g., at or using the one or more serving cells. For example, the modules 102, 104 and 106 may perform the steps 202, 204 and 206, respectively.

The method 200 may be implemented by one or each of the one or more serving cells, or by a corresponding base station. For example, a first cell and/or a second cell among the one or more cells serving the radio device, or the corresponding base station, may perform the method 200. Alternatively or in addition, the technique may be implemented at any node connected to the one or more serving cells, e.g., in a core network connected to the RAN.

In any aspect, the step of updating the list may comprise or may be implemented by including, in the list, a neighbor relation between the one second cell and at least one of the one or more serving cells. Alternatively or in addition, the step of updating the list may comprise or may be implemented by excluding, from the list, a neighbor relation between at least one of the one or more serving cells and another one of the at least two second cells other than the one second cell from which the measurement signal is received at the radio device.

The measurement signal may comprise at least one of a reference signal (RS) and a synchronization signal (SS). The RS may be a channel state information RS (CSI-RS). The SS may be, or may be comprised in, a SS block (SSB).

The step of initiating the transmission of the measurement signals may comprise or may be implemented by sending a RAN control message to each of the at least two second cells, the RAN control message triggering the respective second cell to transmit the measurement signal. Each of the RAN control messages may comprise a request for the transmission of the measurement signal at the respective second cell.

At least one or each of the at least two RAN control messages may be transmitted to the respective second cell via a first cell of the RAN that is a neighboring cell of the respective second cell. The first cell may be a neighboring cell of the respective second cell and a neighboring cell of at least one of the one or more serving cells. Alternatively or in addition, the first cell via which the RAN control messages is transmitted may be connected (e.g., by means of an X2 interface) to both the one or more serving cells and the respective second cell. Transmitting a RAN control message via one or more intermediate cells (e.g., more specifically: one or more base stations) may also be referred to as forwarding or as transmitting on a temporary neighbor relation.

The RAN control message may use inter-node signaling (e.g., an X2 connection or an Xn connection) according to, or as an enhancement of, the document 3GPP TS 36.423, version 15.1.0 (for LTE) or 3GPP TS 38.423, version 0.8.0 (for NR). In case of setting up a temporary neighbor relation, the RAN may setup the inter-node signaling or connection properly and/or tear down any inter-node signaling or connection that was set up wrongly due to the PCI conflict, i.e., tear down the temporary neighbor relation between the one or more serving cells and another one of the at least two second cells other than the one second cell from which the measurement signal is received at the radio device.

Each of the RAN control messages may comprise a request for a handover to the respective second cell or a request for adding the respective second cell to a secondary cell group (SCG).

The confirmation report may be transmitted from the radio device to one of the one or more serving cells.

The step of initiating the transmission of the measurement signals may comprise or may be implemented by transmitting a radio resource control (RRC) message to the radio device, the RRC message configuring the radio device to measure the measurement signal according to a measurement configuration of the one or more serving cells and/or according to a resource configuration of each of the at least two second cells.

The RRC message may be compatible with, or an enhancement of, the document 3GPP TS 36.331, version 15.1.0 (for LTE) or 3GPP TS 38.331, version 15.1.0 (for NR), particularly for inter-node RRC messages, e.g., related to a handover command.

The RRC message may be indicative of a measurement configuration. For example, the RRS message may modify the measurement configuration by adding the at least two second cells to a list of measurement objects. The measurement configuration may be provided by means of dedicated signaling, e.g., using an RRCReconfiguration message, particularly an RRC IE measConfig therein.

Alternatively or in addition, the RRC message may be indicative of a resource configuration for each of the at least two second cells, e.g., according to the document 3GPP TS 38.331, version 15.1.0, section 6.3.2. The resource configuration may be indicative of radio resources used by the respective second cell for the transmission of the measurement signal, e.g., a CSI-RS or an SSB. The resource configuration may comprise an index (e.g., a CSI-RS-Index or an SSB-Index) or a resource list of such indices (a csirs-ResourceList or an ssb-ResourceList) indicative of the radio resource (e.g., by referring to the measurement object associated with the one or more serving cells). For example, the RRC message may comprise a CSI-RS index for the CSI-RS (as an example of the measurement signal), which may define a CSI-RS periodicity and/or a CSI-RS subframe offset.

By way of example, the CSI-RS configuration of a neighbor cell in the measurement object may compatible with, or an enhancement of, the document 3GPP TS 38.331, version 15.1.0. Particularly, an information element MeasObjectNR according to section 6.3.2 of the document 3GPP TS 38.331 may comprise the CSI-RS configuration. The CSI-RS configuration per PCI, i.e., per neighbor cell, may be provided to the radio device.

The confirmation report may comprise or may be implemented by a measurement report indicative of a result of a measurement of the measurement signal at the radio device. Alternatively or in addition, the confirmation report may be selectively transmitted depending on a result of the measurement of the measurement signal at the radio device. The confirmation report may be selectively transmitted depending on whether a reference signal received power (RSRP) of the measurement signal measured at the radio device.

The confirmation report may be transmitted from the one second cell to one of the one or more serving cells.

The step of initiating the transmission of the measurement signals may comprise or may be implemented by transmitting a radio resource control (RRC) message to the radio device, the RRC message configuring the radio device to transmit a random access (RA) preamble to the one second cell responsive to the reception of the measurement signal at the radio device from the one second cell. The RRC message may trigger the radio device to transmit the RA preamble to the one second cell responsive to the reception of the measurement signal at the radio device from the one second cell. The RA preamble may initiate a RA procedure and/or a connection establishment with the one second cell.

A radio resource used for the transmission of the RA preamble to the one second cell may depend on the measurement signal received at the radio device from the one second cell. The one second cell may (e.g., uniquely) associate the received RA preamble with its transmission of the measurement signal based on the radio resource.

The RRC message may be indicative of resources for the transmission of the RA preamble for each of the at least two second cells. The indicated resources may specify one or more RA preambles to be used or usable by the radio device for the transmission. A RA procedure initiated by the RA preamble may be contention-free. The RRC message may be indicative of an index, or a list of such indices, for the RA preamble to be used or usable by the radio device for the transmission. The one second cell may (e.g., uniquely) associate the received RA preamble with its transmission of the measurement signal based on the indicated RA preamble.

Alternatively or in addition, the indicated resources may specify one or more radio resources to be used or usable by the radio device for the transmission. The RRC message may be indicative of a list of RA occasions and/or a mask index for RA occasions. The RA occasion may be a temporal radio resource, i.e., a radio resource defined in the time domain. The RA occasion may also be referred to as a physical RA channel (PRACH) occasion.

The RRC message may comprise (e.g., for each of the at least two second cells) an information element (IE) indicative of the resources for the transmission of the RA preamble. The indicated resources may also be referred to, or may be part of, system information (SI) for the respective second cell. For example, the RRC message may comprise the RRC IE Rach-ConfigDedicated according to the document 3GPP TS 38.331, version 15.1.0, section 6.3.2. The RRC IE may comprise a parameter ra-ssb-OccasionMaskIndex for the mask index and/or a parameter ra-OccasionList for the list of RA occasions.

The RRC IE RACH-ConfigDedicated may define the radio resource for the RA preamble relative to the radio resource used for the CSI-RS in the frequency domain (e.g., on the same frequency) and/or in the time domain (e.g., at a predefined offset in terms of TTIs). More specifically, the parameter CFRA-Resources may be indicative of the radio resource for the RA preamble.

For each of the at least two second cells, the RRC message may be indicative of an association between the measurement signal from the respective second cell and one or more RA occasions for the transmission of the RA preamble to respective second cell if the measurement signal is received from the respective second cell.

The RRC message may be indicative of PRACH occasions for the transmission of the RA preamble to the one second cell among the at least two second cells. If an SSB is the measurement signal and an association between PRACH occasions and SSBs is configured, the radio device may determine the next available PRACH occasion from the PRACH occasions corresponding to the received SSB, e.g., as permitted by the restrictions given by the ra-ssb-OccasionMaskIndex. For example, the radio device (e.g., its MAC entity) may take into account the possible occurrence of measurement gaps (e.g., defined by the measurement configuration of the one or more serving cells) when determining the next available PRACH occasion corresponding to the received SSB. If a CSI-RS is the measurement signal and an association between PRACH occasions and CSI-RSs is configured, the radio device may determine the next available PRACH occasion from the PRACH occasions in the ra-OccasionList corresponding to the received CSI-RS. The radio device (e.g., its MAC entity) may take into account the possible occurrence of measurement gaps when determining the next available PRACH occasion corresponding to the received CSI-RS.

The confirmation report may be received from the one second cell. The confirmation report may be indicative of the reception of the measurement signal at the radio device by being indicative of reception of the RA preamble at the one second cell from the radio device or by being indicative of completion of a RA procedure at the one second cell with the radio device. The confirmation report may be indicative of the RA (e.g., successfully) performed by the radio device to the one second cell. Alternatively or in addition, the confirmation report may comprise a request for the neighbor relation and/or an X2 connection between the one second cell and at least one of the one or more serving cells.

The method may further comprise a step of determining the at least two second cells. For example, it may be determined that the at least two second cells use identical physical cell identifiers (PCIs). The transmission of the measurement signal may be initiated responsive to the determination. The usage of the identical PCI by at least two second cells, e.g., as determined from the perspective of the one or more serving cells, may also be referred to as PCI conflict.

The determination of the at least two second cells may comprise a step of sending a request to one, two or more first cells neighboring the one or more serving cells. The request may be indicative of a PCI for second cells. The determination of the at least two second cells may further comprise a step of receiving one or more responses from one, two or more of the requested first cells. The responses may be indicative of the at least two second cells using the identical PCI indicated in the request.

Alternatively or in addition, the determination of the at least two second cells may comprise determining the identical PCI among second cells associated with the one or more serving cells and/or second cells indicated in the responses from the neighboring first cells.

The determination of the at least two second cells may comprise a step of determining the identical PCI based on statistics of failed handovers involving a second cell using the identical PCI. Alternatively or in addition, the identical PCI may be determined based on statistics of failed dual connectivity establishments involving a second cell using the identical PCI.

The second cells of the RAN may transmit synchronization signals that are indicative of respectively used PCIs. The second cells with overlapping coverage area may use different PCIs.

The at least two second cells using the identical PCI may be associated with the one or more serving cells and/or with one, two or more of those first cells neighbors of the one or more serving cells. The second cells may be locally distinguished by the PCIs used by the second cells in that second cells with overlapping coverage area use different PCIs. The PCIs of the second cells may be ambiguous from the perspective of the one or more serving cells, i.e., there may be a PCI conflict.

The method may be performed by a first cell of the RAN that is serving the radio device. The radio device may be radio-connected to each of the one or more serving cells. The one or more serving cells may comprise the serving first cell and, optionally, a serving second cell configured to provide dual connectivity to the radio device. The radio-connected state of the radio device relative to the one or more serving cells may be controlled by a radio resource control (RRC) entity of the serving first cell.

The measurement signal may be cell-specific for the respective one of the at least two second cells transmitting the measurement signal. For example, the measurement signal (e.g., the reference signal) may be scramble by the PCI used by the respective second cell. A sequence encoded in the measurement signal (e.g., in the synchronization signal) may be indicative of the PCI used by the respective second cell.

The one or more serving cells may comprise one of the first cells. The serving first cell may serve the radio device in a single connectivity mode. Alternatively, the one or more serving cells comprise one of the first cells and one of the second cells, which are serving the radio device in a dual connectivity mode.

The method may further comprise performing a handover of the radio device based on the updated list of neighbor relations. Alternatively or in addition, the method may further comprise establishing a dual connectivity for the radio device based on the updated list of neighbor relations.

In any aspect, the first RAT may comprise at least one of the Global System for Mobile Communications (GSM), the Universal Mobile Telecommunications System (UMTS), Long Term Evolution (LTE), MulteFire and/or New Radio (NR). Herein, NR may encompass any 5th generation (5G) mobile networks. Alternatively or in addition, the second RAT may comprise at least one of NR and Wi-Fi. For example, the first RAT may comprises 3GPP Long Term Evolution (LTE) or Evolved Universal Terrestrial Radio Access (E-UTRA), and the second RAT may comprise 3GPP New Radio (NR).

Herein, any feature described in relation to one or more cells may be realized in relation to one or more base stations serving said one or more cells, respectively. For example, base stations serving neighboring cells may be referred to as neighboring base stations. A base station serving a first cell (e.g., an LTE cell) may be referred to as a first base station (e.g., an LTE base station). A base station serving a second cell (e.g., an NR cell) may be referred to as a second base station (e.g., an NR base station).

A base station may encompass any node that is configured to provide radio access to the radio device. The expression "node" may be synonymous with the expression "base station". Any base station or cell of the RAN may serve a plurality of radio devices. Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The technique may be implemented on a Physical Layer (PHY), a Medium Access Control (MAC) layer, a Radio Link Control (RLC) layer and/or a Radio Resource Control (RRC) layer of a protocol stack of the first and/or second RAT.

The radio device may be configured for peer-to-peer communication with another radio device (e.g., on a sidelink) and/or for accessing the one or more serving cells (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle.

In any aspect, the first cells of the RAN may be (e.g., on average) coarser or greater in terms of coverage area compared to the second cells of the RAN. Alternatively or in addition, a second area covered by the second cells of the RAN may be a portion of a first area covered by the first cells of the RAN.

A first frequency band used by the first cells for the first RAT may be different from a second frequency band used by the second cells for the second RAT. All radio frequencies of the second frequency band may be greater than all radio frequencies of the first frequency band. For example, the first frequency band may be below 6 GHz, and the second frequency band may be at or above 6 GHz.

The one or more cells of the RAN serving the radio device may also be referred to as the one or more serving cells or as the at least one serving cell. The at least two second cells may be target cells and/or measurement objects.

The one second cell (among the at least two second cells) from which the measurement signal is received at the radio device may also be referred to as the neighboring second cell. The one second cell may be the one of the at least two second cells neighboring the one or more serving cells. The radio coverage of the one second cell may overlap with radio coverage of the one or more serving cells, e.g., since the radio device may be within the radio coverage of the one second cell (based on the confirmation report) and within the radio coverage of the one or more serving cells (based on the fact that the one or more serving cells serve the radio device).

At least some embodiments can (e.g., uniquely) determine, among the at least two second cells, the one second cell that is neighboring the one or more serving cells and/or that is covering an area overlapping with an area covered by the one or more serving cells.

Herein, a pair of the cells of the RAN may be referred to as neighboring cells if an area of radio coverage areas of the pair of cells overlap (e.g., including a complete overlap). Alternatively or in addition, a pair of the cells of the RAN may be referred to as neighboring cells if the pair of cells is directly connected (e.g., by one X2 interface connected the pair).

The confirmation report may be transmitted from the radio device, e.g., responsive to the reception of the measurement signal from the one second cell. Alternatively or in addition, the one second cell may sent the confirmation report. The radio device may, responsive to the reception of measurement signal from the one second cell, transmit a control signal to the one second cell that triggers the confirmation report sent from the one second cell.

The confirmation report indicative of the measurement signal reception may be implemented by any control plane message or signaling that is indicative of (e.g., implies or confirms that) the radio device being within the radio coverage of the one second cell. The reception of the measurement signal from the one second cell may be an indication or confirmation for the radio device being within the radio coverage of the one second cell.

The first base stations providing radio access according to the first RAT in respective first cells of the RAN may further function as a backbone for the second base stations providing radio access according to the second RAT in respective second cells of the RAN. Furthermore, the backbone may comprise a control plane and a data plane of the RAN, e.g., by means on an X2 interface between the base stations.

The technique may be implemented in a network (e.g., the RAN and/or the core network) providing radio access according to at least one of 3GPP LTE as the first RAT and 3GPP NR as the second RAT, particularly non-standalone NR (NSA NR). Embodiments of the technique can provide an Automatic Neighbor Relation (ANR) function, particularly for an LTE-assisted NSA NR ANR function. Same or further embodiments can avoid or resolve a conflict (e.g., an ambiguity) in physical cell identifiers (PCIs) assigned to NR cells in the network.

The RAN may provide dual connectivity (DC), e.g., according to LTE (i.e., evolved UMTS Terrestrial Radio Access or E-UTRA) as the first RAT and NR as the second RAT, which is abbreviated by EN-DC. Particularly, embodiments may enable a conflict-free EN-DC ANR function. Herein, dual connectivity is described as a non-limiting example of multi-connectivity, e.g., according to the document 3GPP TS 37.340, version 15.1.0.

A first embodiment of the technique may use a channel state information reference signal (CSI-RS) as the measurement signal. A second embodiment, which may be combinable with the first embodiment, may establish a temporary neighbor relation with the at least two second cells and/or may use a synchronization signal (SS) as the measurement signal. The temporary neighbor relation may include redirecting a communication via another node of the RAN (e.g., a node that is not in the temporary neighbor relation) and/or releasing the temporary neighbor relation (e.g., with those of the at least two second cells from which no measurement signal is received at the radio device).

At least some of the embodiments resolve or aid to resolve the NR PCI conflict, e.g., in an EN-DC scenarios or any other scenario wherein the NR cells as the second cells do not transmit any system information (SI), e.g., do not transmit a system information block 1 (SIB1), to specifically aid a global or unambiguous identification of neighboring nodes or neighboring cells.

FIG. 3 schematically illustrates an example of a network 300 for embodying the device 100 and/or for implementing the method 200. The network 300 comprises a core network 302, e.g., an evolved packet core (EPC) network. The network 300 further comprises an embodiment of the RAN 304. The RAN 304 comprises the first cells 306 and the second cells 308.

The embodiment of the RAN 304 may be configured to provide EN-DC to the radio device 310. An LTE base station (eNB) providing LTE radio access in the first cell 306 (also: LTE cell) may embody the device 100. A NR base station 312 may provide NR radio access in the second cell 308. The NR base station 312 may also be referred to as NR node or gNB, and particularly as NSA NR node or en-gNB in its role for EN-DC.

3GPP has specified NR for an NSA NR network, which utilizes an existing LTE RAN comprising the eNB 100 and the EPC network with the addition of an NR carrier. The NSA NR nodes 312 have an eNB 100 as a master node. System Information (SI) needs not to be transmitted in the NR carrier, e.g., as the UE 310 does not camp on the NR cell 308. Peer RRC entities 314 and 316 may be implemented at the UE 310 and the eNB 100 serving the UE 310, respectively.

The eNB 100 may have a control plane (CP) and a user plane (UP) connection with the EPC 302, e.g., by means of a 3GPP S1 interface. The backbone function provided by the eNB 100 for the en-gNB 312 comprises a 3GPP X2 interface for the CP and the UP. Optionally, the en-gNB 312 is further connected to the EPC in the UP.

In any embodiment, the step 206 of updating the list of neighbor relations may comprise adding a further gNB corresponding to the one second cell to the list of neighbor relations. At least one or each of the eNB 100 and the gNB 312 may maintain such a list of neighbor relations.

In the step 206, any embodiment of the eNB 100 (as a serving first cell) may use an Enhanced Cell Global Identity (ECGI), a Tracking Area Code (TAC) and/or a Public Land Mobile Network identifier (PLMN ID) assigned to the one second cell to look-up a transport layer address to the neighboring gNB of the one second cell, to update its neighbor relation list, to update the neighbor relation list of the gNB 312 (as a serving second cell) and/or, e.g., if needed, to setup an 3GPP X2 interface towards this neighboring gNB of the one second cell. The 3GPP X2 interface and/or steps for setting up the interface may be specified in the document 3GPP TS 36.300, e.g., version 15.1.0 and/or the document 3GPP TS 32.511, version 14.2.0.

Figure 4:
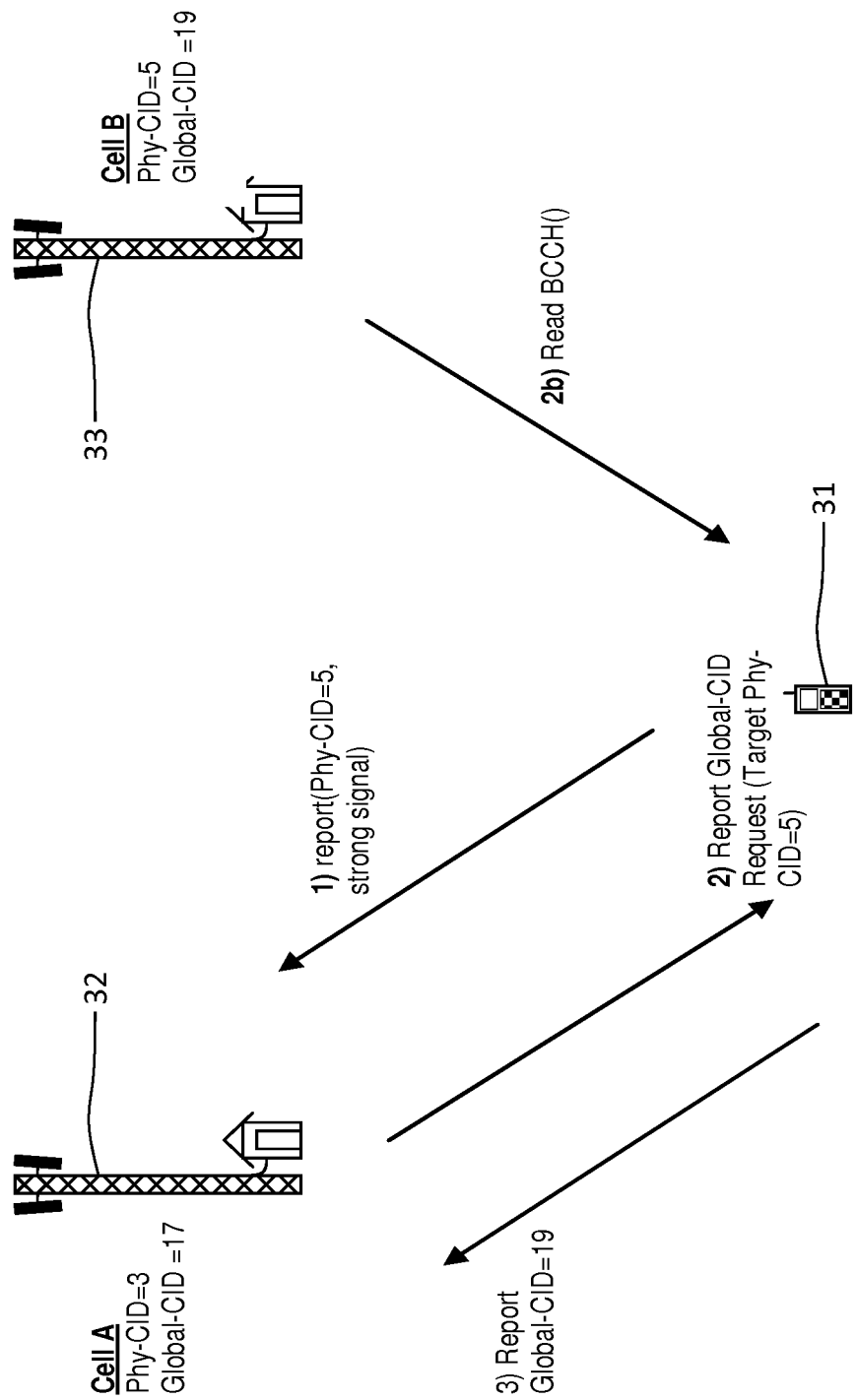
FIG. 4 schematically illustrates a comparative example for a conventional automatic neighbor relation function.

FIG. 4 schematically illustrates a first comparative example including a conventional SI-based ANR function for a 3GPP LTE RAN 30, e.g., according to the 3GPP TS 36.300, version 15.1.0. In a step 1), the UE 31 transmits a measurement report to the serving eNB 32, containing the PCI of cell B served by eNB 33. The eNB 32 then instructs the UE 31 to read an Enhanced Cell Global Identity (ECGI), a Tracking Area Code (TAC) and all available one or more Public Land Mobile Network (PLMN) identifiers (IDs) of the cell B. The neighbor cell B, i.e., the eNB 33, broadcasts its PLMN IDs, TAC etc. in the SIB1 message. After measuring these values, the UE 31 reports the detected ECGI to the serving eNB 32, and the eNB 32 decides to add this neighbor relation between the eNBs 32 and 33 to its list of neighbor relations.

The SI-based ANR function may be limited to LTE cells. In the absence of SI from NR cells, a PCI-based ANR function may rely on the PCI, which may be reported by the radio device to the serving cell based on synchronization signals and/or reference signals received from the NR cells. However, PCI-based ANR functions may be susceptible to PCI conflicts.

The method 200 may be implemented as an enhancement of any SI-based and/or PCI-based ANR function. For example, since the eNB 100 of the one or more serving cells 306 and 308 may initiate the measurement signal in the step 202 for the at least two second cells having the same NR PCI, the eNB 100 may associate the confirmation report received in the step 204 with the one second cell that is actually a neighboring cell of the serving cell 306 and/or 308.

A second comparative example, which avoids an ambiguity caused by the PCIs of the second cells, always transmits SI from each of the cells including the second cells (e.g., NR cells served by an NSA NR node). But transmitting SI from each cell according to the second comparative example may be a disproportionate usage of radio resources, since the ANR function may be only used once further neighboring cell is deployed or when the radio propagation environment changes.

Embodiments of the technique can avoid such an additional signaling overhead just for the ANR function.

A third comparative example, which aims at resolving the ambiguity among the PCIs of the second cells, allocates reserved random access resources to the reporting radio device. All nodes of the RAN listen to the allocated random access resources that are dedicated for ANR purposes in an NSA scenario. Hence, the third comparative example increases the wastage of random access channel (RACH) resources as the ANR function is a seldom used functionality in the RAN.

Embodiments of the technique can avoid such a wastage of RACH resources just for the ANR function.

A fourth comparative example uses always-on LTE signals to generate radio fingerprints by means of machine learning. However, such a radio fingerprint-based ANR function can require significantly longer time compared to embodiments of the technique, as radio fingerprinting is performed based on location-dependent reference signal received power (RSRP) values.

Embodiments of the technique can achieve a faster ANR function and/or require less computational resources for the ANR function.

While the technique is primarily described in the context of EN-DC for clarity and conciseness, any embodiment may be applied in a RAN 304 using the first cells (e.g., LTE) as backbone for enabling the ANR function for the second cells (e.g., NR NSA deployments). By combining PCI-specific measurements at the radio device from the second cells (e.g., UE measurements in NR) and information exchange between the neighboring first nodes 100 (e.g., LTE nodes) about their associated second nodes 312 (e.g., NR nodes), neighboring second cells (e.g., unknown to the one or more serving cells), e.g., NSA NR neighbors, may be determined and/or neighbor relations may be established automatically.

The information exchange may be based on the NR PCI in an example of an NR PCI-based ANR function. If at least two of the neighboring LTE cells 100 have different associated NR cells 312 with the same PCI in their coverage areas, the NR PCI-based ANR function has a PCI conflict (more specifically: an NR PCI conflict for LTE cell). Herein, second cells or second nodes that are "associated" with a first cell or first node may encompass second cells or second nodes listed in the list of neighbor relations at the respective first cell or first node. Alternatively or in addition, the second cells or nodes "associated" with a first cell or node may encompass second cells or nodes that have an interface (e.g., an 3GPP X2 interface) with the respective first cell or node.

The PCI conflict may be resolved by an implementation of the method 200 using the at least two second cells with the same PCI in the step 202. The transmission of the measurement signals from the conflicting at least two second cells leads to the reception of the confirmation report in the step 204 that resolves the PCI conflict and enables the correct identification of the one second cell that the UE 310 initially included in the PCI-specific measurement report.

In a first embodiment, when the first cell 100 among the one or more serving cells (e.g., an LTE master cell) determines the PCI conflict, the step 202 comprises the first cell 100 requesting for the transmission of an CSI-RS as an example for the measurement signal from each of the at least two second cells which caused the PCI conflict. By receiving the measurement report (or CSI report) as an example of the confirmation report in the step 204, the first cell 100 performs or aids the neighbor relation establishment in the step 206.

In a second embodiment, which may be combined with the first embodiment, when the first cell 100 among the one or more serving cells (e.g., an LTE master cell) determines the PCI conflict, the step 202 comprises the first cell 100 receiving the system information (e.g., RACH resources) of each of the at least two second cells causing the PCI conflict. By further transmitting this information (either system information of one of the second cells at a time or the system information of all the at least two second cells at once) to the UE 310 in the step 202, the UE 310 is provided the information necessary to access the one second cell among the at least two second cells whose synchronization signal block (SSB) is audible to (i.e., received at) the UE 310. Based on the random access procedure performed by the UE 310, the one second cell among the at least two second cells send the confirmation report to the serving first cell 100 according to the step 204.

In any embodiment, the neighbor relation list may be updated in the step 206 by including a neighbor relation between the first cell 100 and the one second cell indicated by the confirmation report. In other words, the ANR may relate to first and second cells. Alternatively or in addition, the neighbor relation list may be updated in the step 206 by including a neighbor relation between the serving second cell 312 (e.g., associated with the first cell 100 for EN-DC) and the one second cell indicated by the confirmation report. In other words, the ANR may relate to second cells.

A first implementation of detecting the PCI conflict may be based on an analysis or a comparison of reports from neighboring first cells. The reports may be responsive to a request for reporting associated second cells with a certain PCI according to the second RAT. Each of the analyzed or compared reports may be indicative of a second cell associated with the reporting first cell. The PCI conflict may be determined if, for a certain PCI of the second RAT (e.g., an NR PCI), reports indicative of two or more second cells are received from the neighboring first cells.

Hereinafter, for brevity and not limitation, a first cell "X" (or the corresponding first node) is referred to as cell $LTE_X$ and a second cell "Y" (or the corresponding second node) is referred to as cell $NR_X$.

Figure 5:
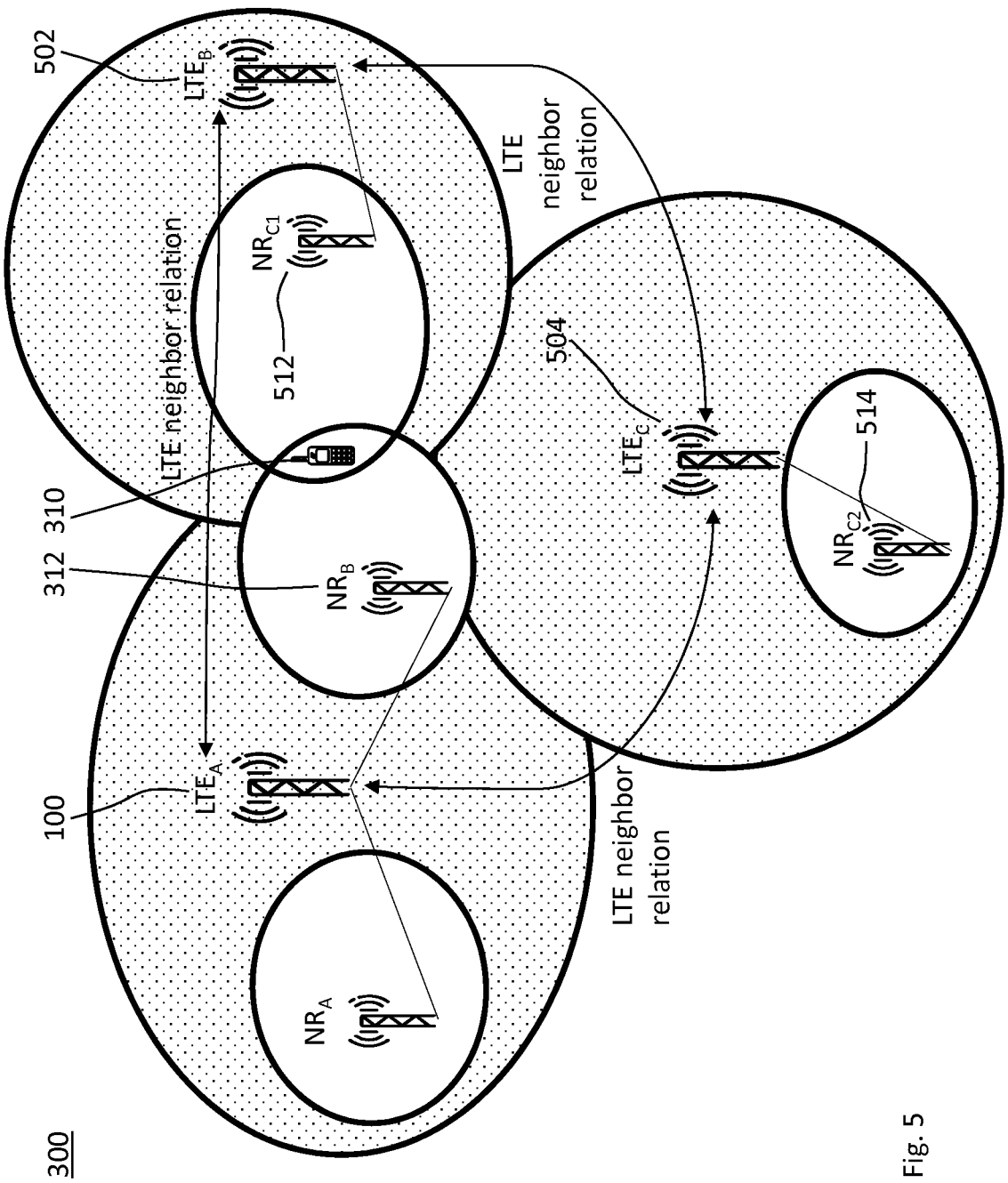
FIG. 5 schematically illustrates a second exemplary network deployment for embodying the device of FIG. 1 and implementing the method of FIG. 2.

FIG. 5 schematically illustrates an embodiment of a network 300 comprising a PCI conflict. In the scenario depicted in FIG. 5, a UE 310 is connected to cells $LTE_A$ 100 and $NR_B$ 312. Upon detecting the NR cell $NR_{C1}$ 512 with PCI $NR_C$, the NR PCI-based ANR function includes sending a request from $LTE_A$ cell 100 for the identification of the NR cell with NR PCI=$NR_C$ to the LTE neighbors $LTE_B$ 502 and $LTE_C$ 504. Since both neighbors $LTE_B$ 502 and $LTE_C$ 504 receiving the request are associated with an NR cell with NR PCI=$NR_C$, namely NR cell $NR_{C1}$ 512 and NR cell $NR_{C2}$ 514, the one or more serving cells (e.g., a source cell for a handover), namely $LTE_A$ 100 and $NR_B$ 312, determines a PCI conflict. The PCI conflict may also be referred to as "NR PCI conflict for LTE cell", because the PCI conflict may occur if both LTE neighbors of the LTE cell report that they are associated with an NR cell having NR PCI=$NR_C$.

In the first implementation of determining the PCI conflict, the NR PCI conflict is detected using the neighboring LTE cell's report of the NR cells associated to them. The first implementation of the PCI conflict determination may determine the PCI conflict in the scenario depicted in FIG. 5.

Figure 6:
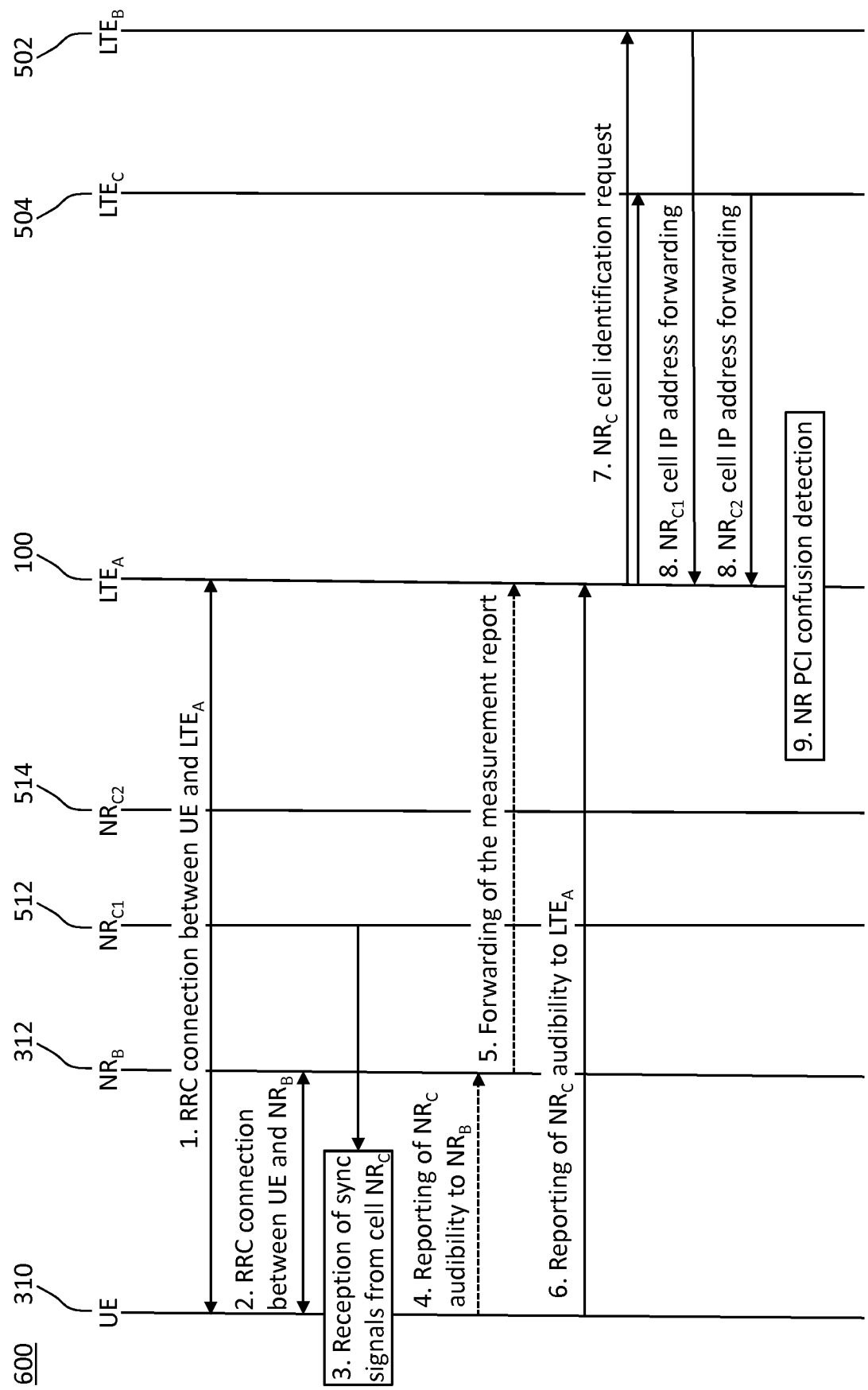
FIG. 6 schematically illustrates a first exemplary signaling diagram resulting from an implementation of the method of FIG. 2, which method may be implementable in the exemplary network deployment of FIG. 5.

A first example for the first implementation of the PCI conflict determination, e.g., for the scenario shown in FIG. 5, is provided by a signaling diagram 600 in FIG. 6. In this scenario, the UE 310 is RRC-connected to $LTE_A$ cell 100 and $NR_B$ cell 312. In the signaling diagram 600, the UE 310 reports the audibility of an NR cell with NR PCI=$NR_C$ to its serving NR cell (i.e., $NR_B$ 312, which is illustrated at steps 4. and 5. in FIG. 6) and/or to its serving LTE cell (i.e., $LTE_A$ 100, which is illustrated at step 6. in FIG. 6). As a value $NR_C$ for the NR PCI is not in the neighbor list of the cell $NR_B$ 312 and/or the cell $LTE_A$ 100, the cell $LTE_A$ 100 requests the neighboring LTE cells 502 and 504 to aid in the process of neighbor relation establishment (illustrated at step 7. in FIG. 6), which is an example for the NR PCI-based ANR function.

In the example illustrated in FIG. 6, two LTE cells, namely cell $LTE_B$ 502 and cell $LTE_C$ 504 (each of which is a neighbor of the cell $LTE_A$ 100), reply to the request with an Internet protocol (IP) address and/or a transport network layer (TNL) address of the cell $NR_{C1}$ 512 and the cell $NR_{C2}$ 514, respectively. Considering this reply, LTE cell $LTE_A$ 100 determines that there is a PCI conflict as two different NR cells, namely $NR_{C1}$ 512 and $NR_{C2}$ 514, are using the same NR PCI, namely $NR_C$. Based on the current report, it is not possible to determine which $NR_C$ cell is being audible to the UE 310. At this stage, the $LTE_A$ 100 determines the NR PCI conflict and it triggers or performs the method 200 for resolving the NR PCI using the two different NR cells in the step 202.

A second implementation of detecting the PCI conflict may be based on an analysis and/or statistics of failures in handovers and/or EN-DC establishments, e.g., from the one or more serving cells to at least one of the at least two second cells. Handover failures to second cells indicated by a certain PCI may indicate the PCI conflict, e.g., if a failure rate for handovers for said PCI is greater than (e.g., at least 50% greater than or twice as frequently as) an average of the failure rate for all handovers.

Figure 7:
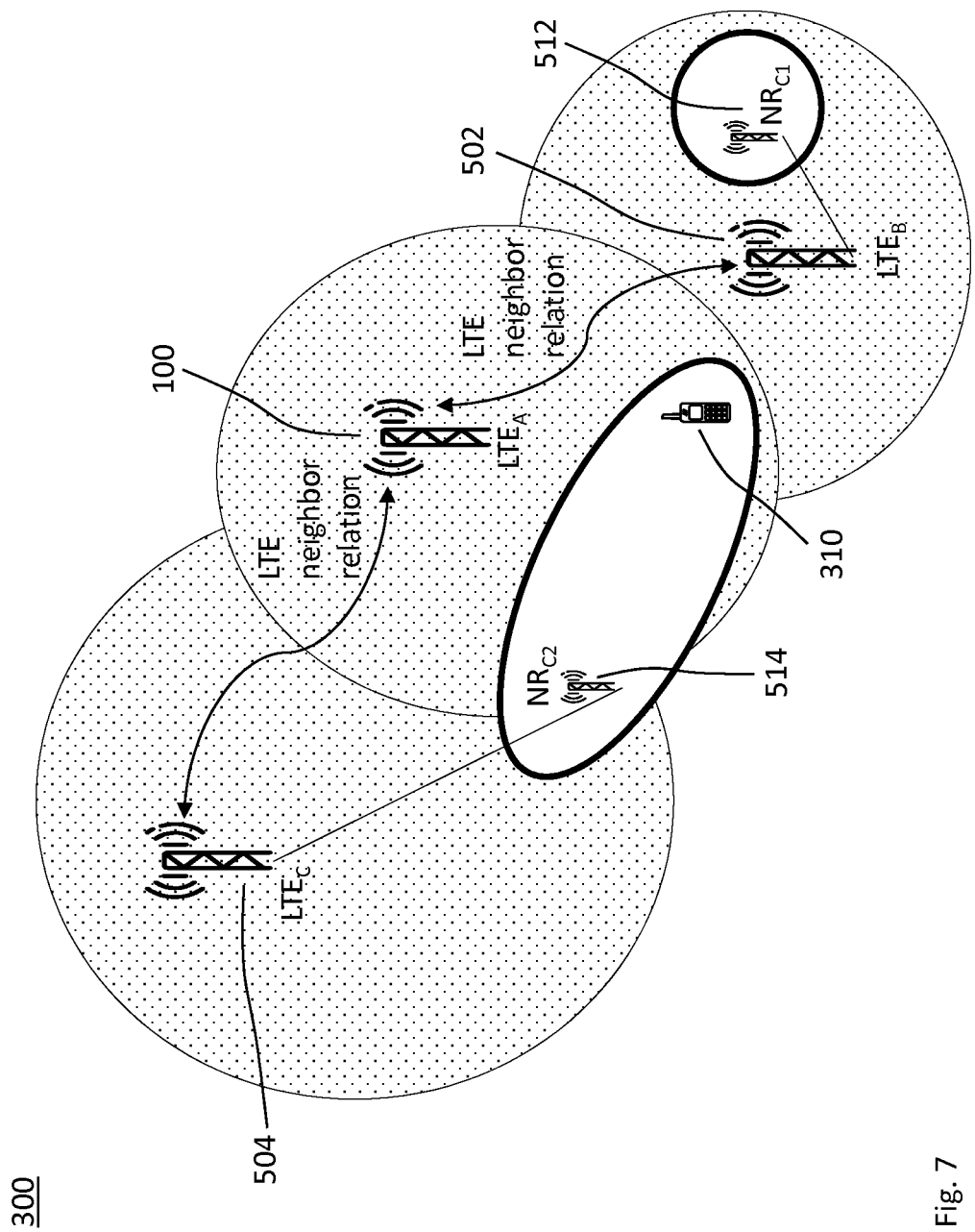
FIG. 7 schematically illustrates a third exemplary network deployment for embodying the device of FIG. 1 and implementing the method of FIG. 2.

A further scenario comprising a PCI conflict is illustrated in FIG. 7. Here, a UE 310 connected to $LTE_A$ can hear (i.e., receive) the NR cell $NR_{C2}$ 514 with NR PCI=$NR_C$, but handover problems indicate that the heard (i.e., received) cell is not the associated NR cell $NR_{C1}$ 512 with NR PCI=$NR_C$. By sending one or more NR PCI-based requests to neighboring LTE cells (e.g., as described for the step 7. of FIG. 6) the LTE cell 100 may determine the IP or TNL address of the NR cell $NR_{C2}$ 514.

The embodiment of the network 300 in FIG. 7 is an example for a PCI conflict, wherein one neighbor LTE cell 504 has an associated NR cell 514 transmitting the same PCI, namely $NR_C$, as an NR cell 512 associated with an LTE source cell 502.

Figure 8:
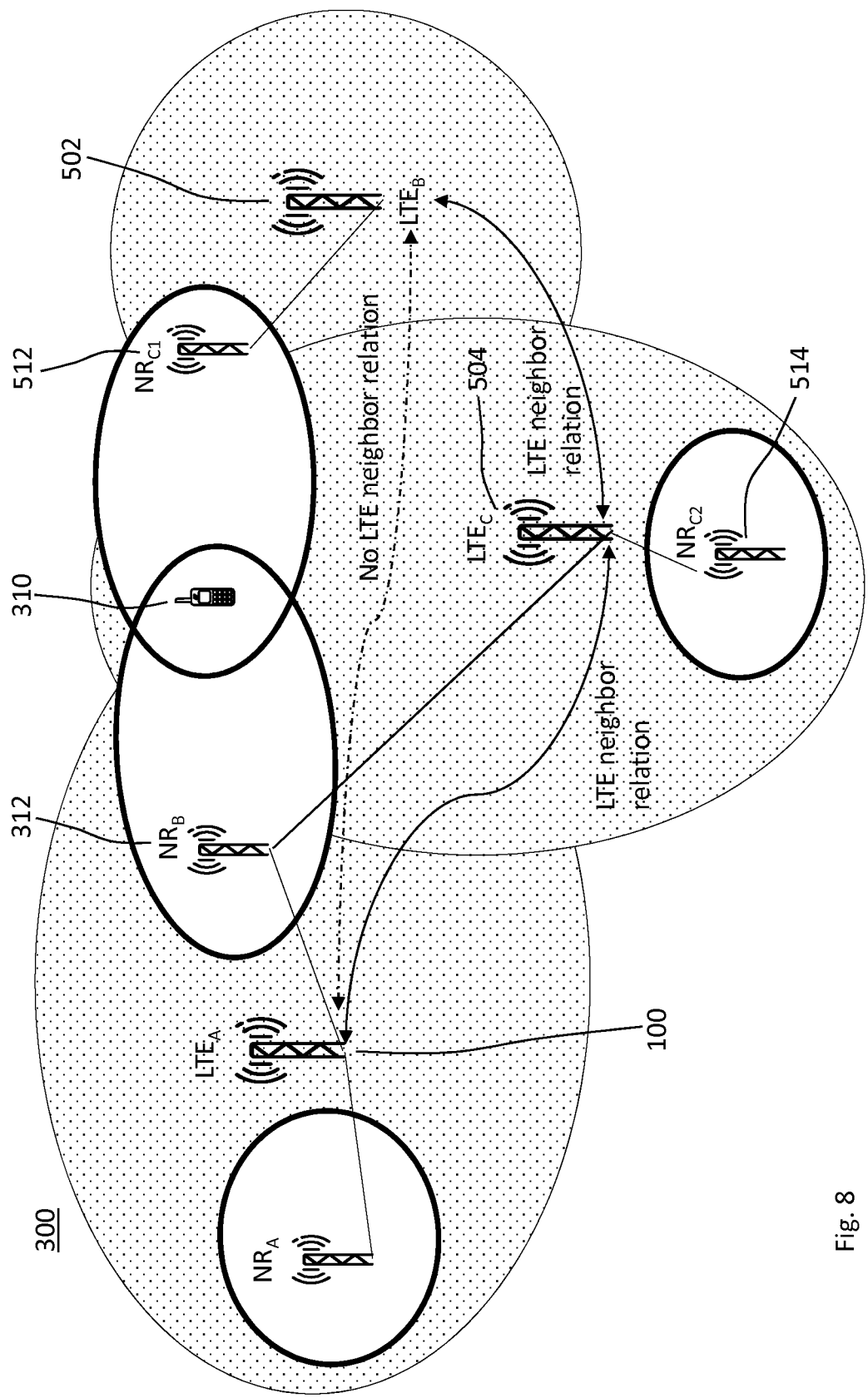
FIG. 8 schematically illustrates a fourth exemplary network deployment for embodying the device of FIG. 1 and implementing the method of FIG. 2.

Any PCI conflict, more specifically, any NR PCI conflict based on the NR PCI=$NR_C$ for the LTE cell 100, may cause a risk for a wrongful neighbor relation establishment. One such scenario is shown in FIG. 8, wherein a UE 310 connected to cell $LTE_A$ 100 and cell $NR_B$ 312 hears an NR cell, namely the cell $NR_{C1}$ 512 with PCI NR=$NR_C$ and this NR cell 512 is associated with $LTE_B$ 502. However, there is no neighbor relation between the LTE cells, i.e., between cell $LTE_A$ 100 and cell $LTE_B$ 502. The LTE cell $LTE_A$ 100 has a neighbor relation with the LTE cell $LTE_C$ 504 and this LTE cell 504 is associated with NR cell $NR_{C2}$ 514, which is also transmitting the same NR PCI=$NR_C$. While a NR PCI-based ARM function can, due to the NR PCI conflict for LTE cell 100, wrongly establish a neighbor relation between $LTE_A$ 100 and $NR_{C2}$ 514 as well as between $NR_B$ 312 and $NR_{C2}$ 514, an implementation of the method 200 can avoid adding such a wrong neighbor relation to the list.

The first implementation of the PCI conflict determination may determine the PCI conflict in the scenario depicted in FIG. 8. A second example for the first implementation (i.e., a procedure related to the detection of the PCI conflict), e.g., for the scenario shown in FIG. 8, is provided by the signaling diagram 600 in FIG. 9.

The UE 310 is connected to cell $LTE_A$ 100 and cell $NR_B$ 312, as indicated at the states "1." and "2." in the signaling diagram 600, respectively. The UE 310 reports the audibility of an NR cell 512 NRC (which is indicated at step "3." in the signaling diagram 600) to its serving NR cell (i.e., cell $NR_B$ 312) and/or to its serving LTE cell (i.e., cell $LTE_A$ 100). As the value $NR_C$ for the NR PCI is not in the neighbor list of the cell $NR_B$ 312 and/or the cell $LTE_A$ 100, the LTE cell 100 requests the neighboring LTE cells 502 and 504 to aid in the process of neighbor relation establishment, as described for the NR PCI-based ANR function.

Figure 9:
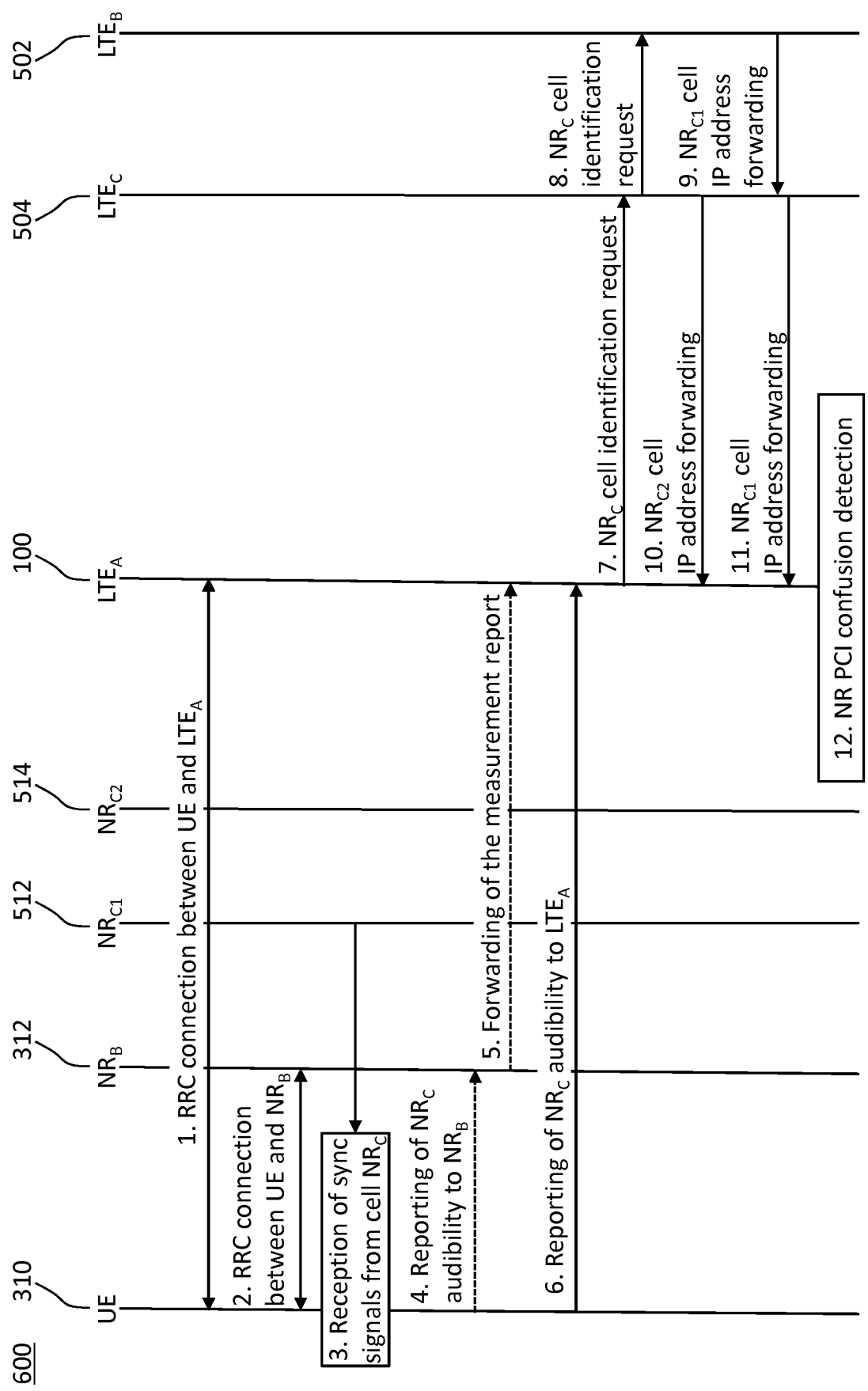
FIG. 9 schematically illustrates a second exemplary signaling diagram resulting from an implementation of the method of FIG. 2, which method may be implementable in the exemplary network deployment of FIG. 8.

In some embodiments of the NR PCI-based ANR function, these neighboring LTE cells (e.g., LTE cell 504) in turn forward the request for $NR_C$ cell identification to their neighboring cells, as shown in step "8." of FIG. 9. The cell $LTE_C$ 504 response to the request from cell $LTE_A$ 100 with the IP address and/or TNL address of the cell $NR_{C2}$ 514 (at the step "10.") and it also forwards the IP address and/or TNL address of the cell $NR_{C1}$ 512 (at the step "11.") as received from the cell $LTE_B$ 502 (at the step "9.").

Based on the responses from the requested LTE cells 502 and 504, the cell $LTE_A$ 100 determines that there is a PCI conflict, e.g., as two different NR cells, namely cell $NR_{C1}$ 512 and cell $NR_{C2}$ 514, are using the same NR PCI, namely $NR_C$. Based on the current report received from the UE 310 (in step "5." and/or "6."), it is not possible to determine which $NR_C$ cell is being audible to the UE 310. At this stage (in the step "12."), the serving cell $LTE_A$ 100 determines the NR PCI conflict.

Independent of the implementation of detecting the PCI conflict, responsive to the detection of the PCI conflict, the serving cell $LTE_A$ 100 may trigger or perform any implementation of the method 200 to resolve the NR PCI conflict.

Figure 10:
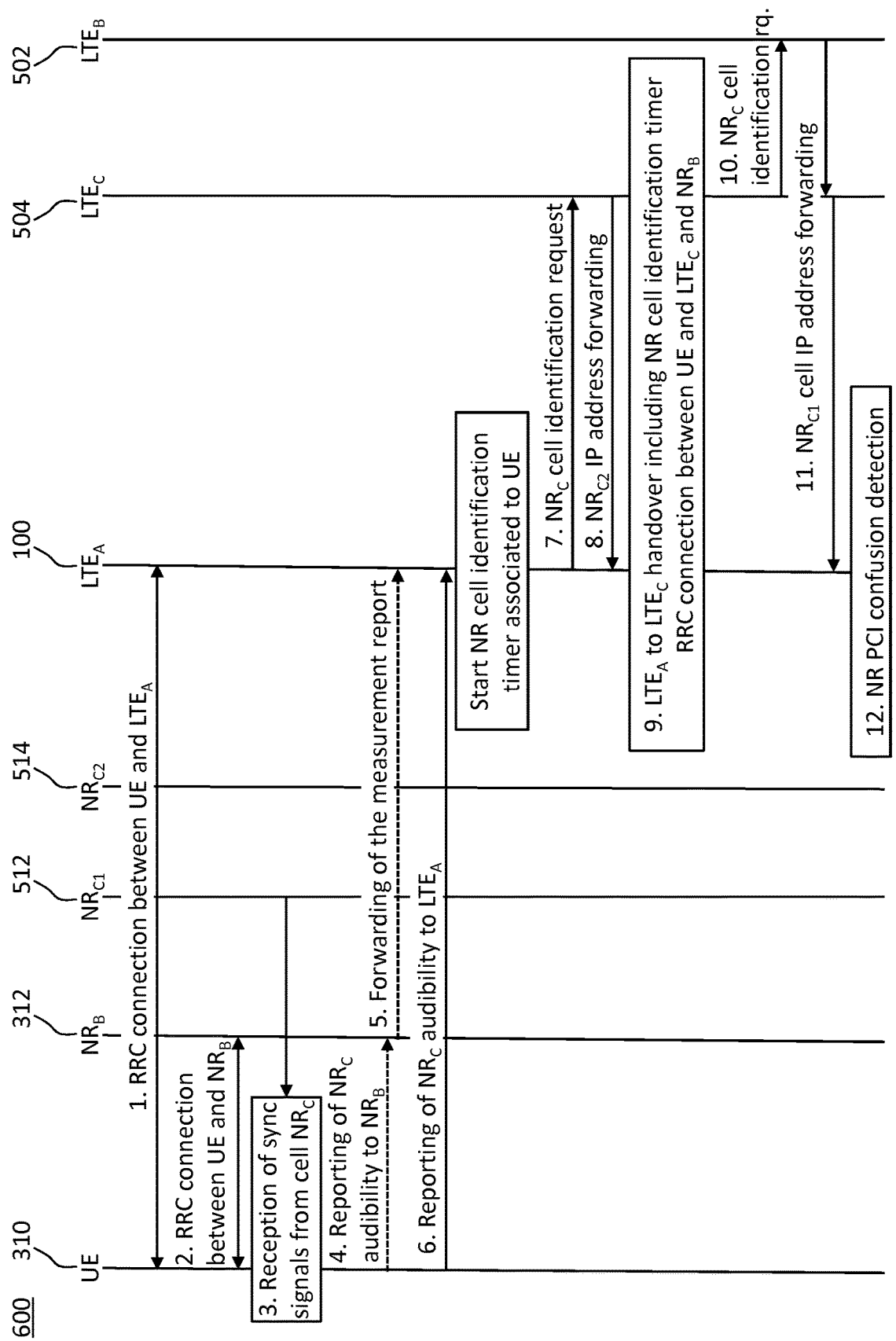
FIG. 10 schematically illustrates a third exemplary signaling diagram resulting from an implementation of the method of FIG. 2, which method may be implementable in the exemplary network deployment of FIG. 8.

A third example of the first implementation of detecting the PCI conflict, e.g., for the scenario shown in FIG. 8, is provided by the signaling diagram 600 in FIG. 10. The UE 310 is connected to the cell $LTE_A$ 100 and the cell $NR_B$ 312. In the signaling diagram 600 in FIG. 10, the UE 310 reports the audibility of an NR cell with NR PCI=$NR_C$ to its serving NR cell (i.e., the cell $NR_B$ 312) and/or to its serving LTE cell (i.e., the cell $LTE_A$ 100). Since the value $NR_C$ for the NR PCI has no entry in the list of neighbor relations of the cell $NR_B$ 312 and/or the cell $LTE_A$ 100, the LTE cell 100 requests its neighboring LTE cells 502 and 504 to aid in the process of neighbor relation establishment, e.g., as described above for the NR PCI-based ANR function. For example, one or more requests indicative of the PCI reported from the UE 310 are sent to respective LTE cells 502 and 504 neighboring the LTE cell 100.

In some embodiments of the NR PCI-based ANR function, the $LTE_A$ 100 starts an NR cell identification timer associated with the UE 310 at the time of sending the one or more requests. Based on the request (in step "7."), the cell $LTE_C$ 504 responds (in step "8.") to the request from the cell $LTE_A$ 100 with the IP address and/or TNL address of the cell $NR_{C2}$ 514 and, if available, forwards the IP address and/or TNL address of cell $NR_{C1}$ 512, as received from the cell $LTE_B$ 502.

After some time, a handover of the UE 310 is performed from the cell $LTE_A$ 100 (i.e., source cell) to the cell $LTE_C$ 504 (i.e., target cell). Since the NR cell identification timer has not yet expired (i.e., run out), the cell $LTE_C$ 504 requests (at step "10.") all of its neighboring LTE cells for the identification of any (respectively associated) NR cell that is using the NR PCI value $NR_C$. As part of these further requests, the cell $LTE_B$ 502 responds (at step "11.") with the IP address and/or the TNL address of the cell $NR_{C1}$ 512. In the exemplary scenario of FIG. 8, the cell $LTE_B$ 502 did not receive any of the requests (in step "8.") from the source cell $LTE_A$ 100, since $LTE_A$ 100 and $LTE_B$ 502 have no neighbor relation.

The response from the cell $LTE_B$ 502 is forwarded by the target cell $LTE_B$ 502 to the source cell $LTE_A$ 100. In a variant, the cell $LTE_B$ 502 may directly address its response (i.e., the contents of the step "11.") to the cell $LTE_A$ 100.

Based on the one or more responses (e.g., the contents of the steps "8." and "11."), the cell $LTE_A$ 100 determines that there is a PCI conflict, e.g., as two different NR cells, namely the cell $NR_{C1}$ 512 and the cell $NR_{C2}$ 514, are having the same PCI, $NR_C$, and with the current report it is not possible to understand which $NR_C$ cell is being audible to the UE currently. At this stage (in step "12."), the cell $LTE_A$ 100 determined the NR PCI conflict for the NR PCI value $NR_C$.

Independent of the implementation of detecting the PCI conflict, the cell $LTE_A$ 100 triggers or performs any embodiment of the method 200 to resolve the NR PCI conflict.

Figure 11:
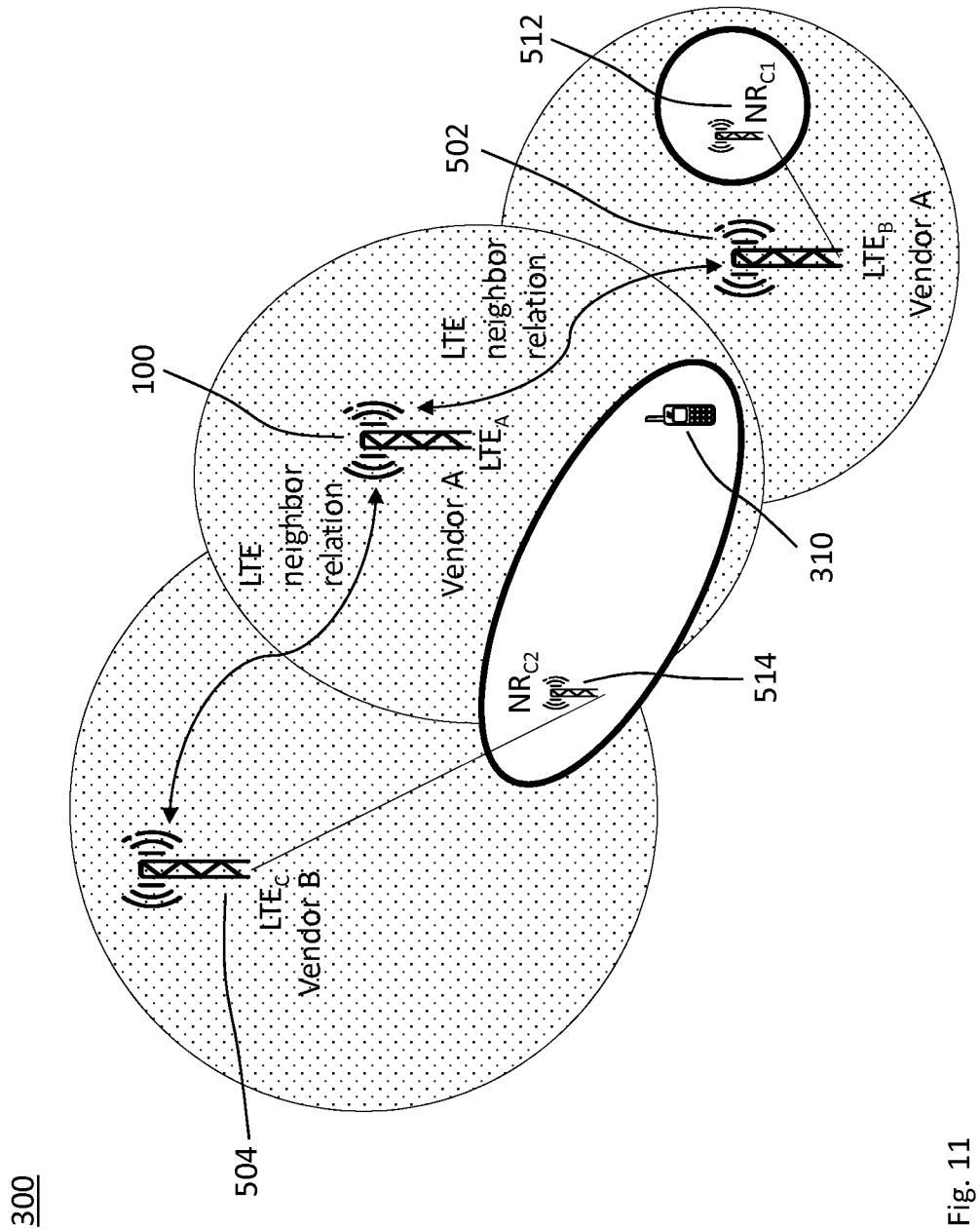
FIG. 11 schematically illustrates a fifth exemplary network deployment for embodying the device of FIG. 1 and implementing the method of FIG. 2.

FIG. 11 schematically illustrates an exemplary network 300 comprising inter-vendor (or multi-vendor) deployments. In this example, the UE 310 is connected to the cell $LTE_B$ 512. The UE 310 detects (e.g., by receiving a PCI-specific SS) an NR cell with PCI $NR_C$, which is actually the cell $NR_{C2}$ 514. The received cell $NR_{C2}$ 514 is associated to cell $LTE_C$ of a vendor other than the source cell $LTE_B$ 502. The source cell $LTE_B$ 502 is associated with the cell $NR_{C1}$ 512 and not with the cell $NR_{C2}$ 514 that is the actual NR cell detected by the UE 310. Thus, setting up EN-DC for the UE 310 using the value $NR_C$ for the NR PCI may cause many failures.

In a fourth comparative example, which aims at resolving the PCI conflict of the NR cells, the LTE node $LTE_A$ 100 requests one or both of the corresponding NR nodes (i.e., $NR_{C1}$ 512 and $NR_{C2}$ 514) involved in the determined PCI conflict to change their NR PCI to some other value (e.g., if possible). While the fourth comparative example may be applicable in the scenario shown in FIG. 5, it is not universally applicable, e.g., not in many scenarios, because changing the NR PCI to a different value (to avoid the PCI conflict) may be impossible. For example, in a multi-vendor deployment 300 as schematically illustrated in FIG. 11, the NR PCIs may be independently assigned to the respective NR cells, without an interface between cells of different vendors for triggering such a change in the NR PCI assignment.

Figure 12:
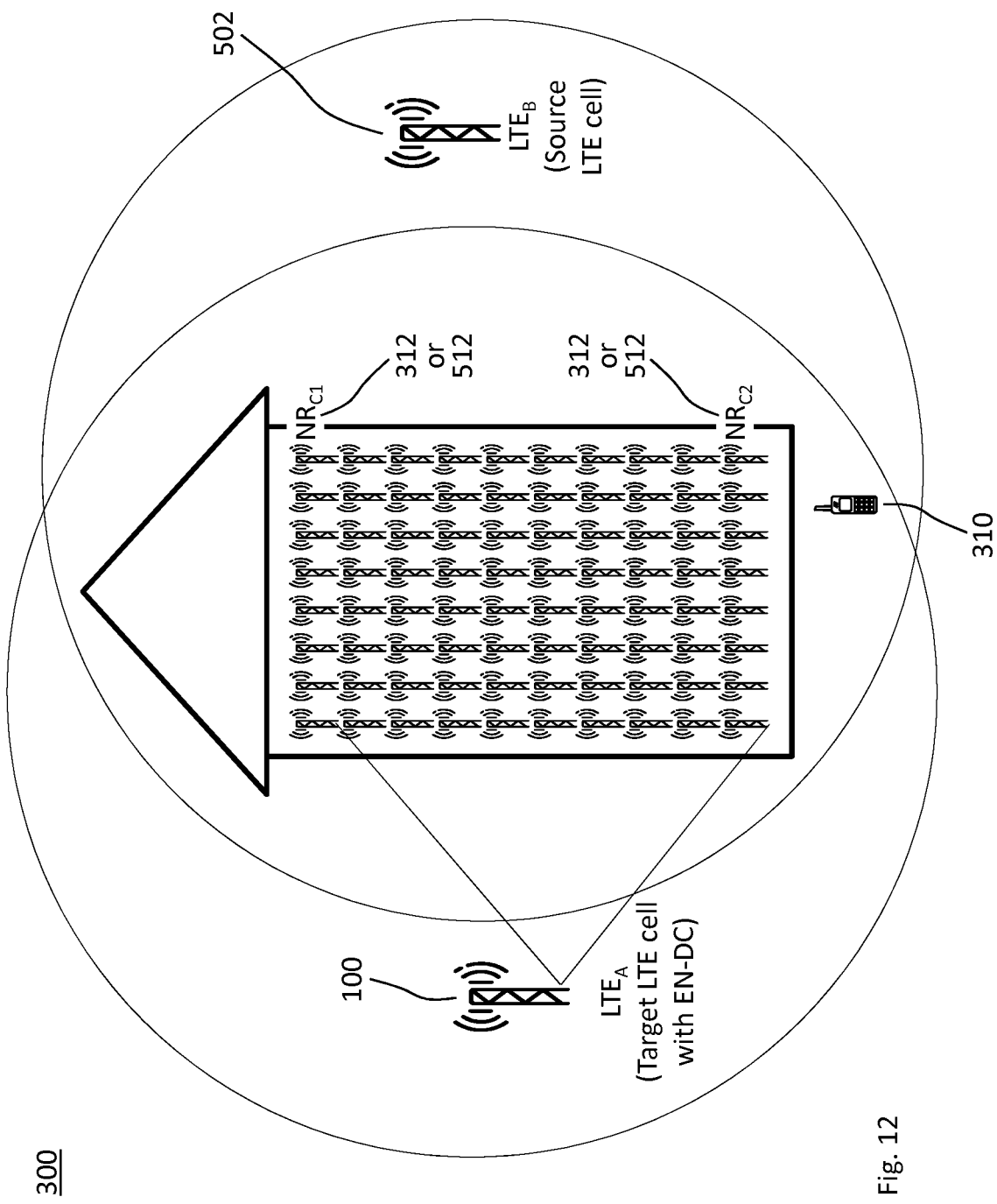
FIG. 12 schematically illustrates a sixth exemplary network deployment for embodying the device of FIG. 1 and implementing the method of FIG. 2.

FIG. 12 schematically illustrates a further exemplary network deployment 300 that does not allow or limit changing the NR PCIs. In the exemplary network deployment 300, a single LTE node 100 may cover and thus be associated with many NR nodes 312. Alternatively or in addition, at least some of the many NR nodes may be covered by and associated with the LTE node 502.

In the exemplary network deployment of the FIG. 12, there is a limitation of the number of NR PCIs available for changing (or resetting) the NR PCIs used by the NR cells, e.g., upon request from an LTE cell (e.g., the $LTE_A$ 100 and/or the $LTE_B$ 502). Therefore, resetting the NR PCI association in a PCI-based ANR function according to the fourth comparative example does also not work in this scenario.

In FIG. 12, the scenario with many NR nodes within the coverage area of a single LTE cell 100 and/or 502 is shown. The number of NR PCIs available to be used by the NR cells may be limited and, thus, at least some NR PCIs may be re-used within the coverage area of the LTE cells $LTE_A$ 100 and/or $LTE_B$ 502, as is schematically indicated by the two NR cells denoted $NR_{C1}$ and $NR_{C2}$ in FIG. 12. From an NR-only point of view, there is no conflict in re-using the PCI $NR_C$ for two NR cells that are sufficiently spaced apart (e.g., so that their NR coverage areas do not overlap).

However, from the perspective of the LTE cells, i.e., within the coverage areas of the LTE cells (which are typically greater than a coverage area of an NR cell), there is a potential PCI conflict.

In the scenario in FIG. 12, the UE 310 is connected to LTE cell $LTE_B$ 502 and the UE 310 reports the audibility of $NR_C$ (e.g., based on the SS transmission from the cell $NR_{C2}$ 312). However, the cell $LTE_B$ 502 has more than one NR cells in its list of neighbor relations that have the PCI NRC, which may cause problems.

An example of the second implementation of determining the PCI conflict, e.g., for the exemplary multi-vendor deployment of the network 300 in the FIG. 11 and/or the handover in the deployment of the network 300 in the FIG. 12, comprises determining a PCI conflict based on a PCI-specific failure rate for initiating handovers, setting up a dual connectivity or any other RRC event. The failure rates may be determined by a source LTE node and/or a serving LTE node (e.g., the $LTE_B$ 502 performing the method 200 and embodying the device 100). The failure rates may be PCI-specific by maintaining a failure counter for each NR PCI reported by the UE 310. For example, whenever an RRC event fails that involves an NR cell with a values $NR_C$ for its NR PCI, a NR PCI-specific counter for the values $NR_C$ may be incremented. Optionally, different NR PCI-specific counters may be maintained for different types of RRC events (e.g., EN-DC setup and handover). By way of example, the NR PCI with the greatest number of failures (e.g., per time and/or per attempts) may be indicative of the identical PCI of the PCI conflict.

The example of the second implementation of determining the PCI conflict may be based on an NR PCI-specific failure analysis (e.g., for EN-DC setup or NR handover). The failure may be NR PCI-specific in that the UE 310 receives an NR cell using the value $NR_C$ for the NR PCI and cannot access it, e.g., based on the system information (SI) parameters provided by the serving LTE cell (e.g., $LTE_B$ 502).

The example of the second implementation of determining the PCI conflict may have the advantage (e.g., compared to at least some examples of the first implementation of determining the PCI conflict) that the serving LTE cell (e.g., $LTE_B$ 502 in FIG. 11 or 12) does not have to access the LTE cells with which the at least two NR cells using the identical NR PCI are associated for determining the PCI conflict. This advantage may be decisive if the NR PCIs cannot be changed in the network 300, e.g., for verify the PCI conflict by requesting the cell $NR_{C1}$ 512 to change its NR PCI, since the NR cells belong to different vendors, so that the request to change the PCIs from vendor-A might be rejected by vendor-B.

Furthermore, a PCI conflict may be detected based on the second cells associated with a given first cell. In any scenarios, e.g., in the exemplary deployment schematically shown in FIG. 12, an LTE cell 100 (e.g., a serving LTE cell 100) may detect the PCI conflict as it has more than one NR cell 312 that has the same PCI as its neighbors. For example in the target state of the scenario shown in FIG. 12, the UE 312 is connected to $LTE_A$ 100 and it reports the audibility of $NR_{C1}$ 312. However, $LTE_A$ 100 has two different NR cells 312 associated with the same NR PCI in its neighbor list. In such a case, the $LTE_A$ 100 determines the NR PCI conflict and the $LTE_A$ 100 triggers or performs the NR PCI conflict resolution according to any implementation of the method 200. Any implementation of the method 200 may be triggered or performed responsive to PCI conflict detection, e.g., independent of the scenario or mechanism for NR conflict detection.

Thus, embodiments of the technique can determine and resolve the PCI conflict in order to have an ANR function that works in all scenarios (e.g., the scenarios schematically illustrated in FIGS. 5, 7, 8, 11 and 12). Implementations of the method 200 may have a robust procedure that can be used with the existing standard mechanisms and without much dependency of multi-vendor deployments.

In any embodiment, the device 100 may also be implemented at one or more further LTE nodes of the RAN, e.g., at the LTE node 502.

In any embodiment, the at least two second cells (e.g., NR cells) in the step 202 may be determined by the PCI conflict. In other words, the at least two second cells may use the same PCI according to the second RAT (e.g., NR PCI) within a coverage area of a first cell among the one or more serving cells. Determining the PCI conflict may be implemented according to any one of the implementation, or examples thereof, described with reference to the FIGS. 5 to 12.

The technique may be applied to many different implementations of the PCI conflict determination, for example including timers, counters and/or statistics. The NR PCI conflict detection may be based on any of these implementations, e.g., a combination of two or more of these implementations.

In a variant of the first implementation of determining the PCI conflict (e.g., as described with reference to FIG. 10), the responses to the cell identification request indicating more than one cell with the same PCI may arrive at the requesting cell at different time instances, e.g., due to different numbers of steps or hops the request is propagated to the neighboring cells. The requesting cell may therefore wait with setting up the neighbor relation, e.g., as described for the NR-PCI-based solutions, until all expected responses has arrived and/or for a preconfigured waiting time.

In a variant of the second implementation, the PCI conflict is determined based on at least one of handover procedures (or handover attempts) and DC setup procedures (or DC setup attempts). For example, the NR PCI conflict is determined by the LTE cell 100 based on statistics of handover and/or DC setup attempts. The second implementation of determining the PCI conflict is particularly applicable to the scenarios schematically depicted in FIGS. 7, 11 and 12.

The UE 310 may be initially connected to the cell $LTE_B$ 502, e.g., as schematically depicted in FIGS. 7, 11 and 12. At this stage, the UE 310 does not have the NR leg of an EN-DC established. The method 200 is implemented at the cell $LTE_B$ 502. Based on an inter-RAT measurement request from the cell $LTE_B$ 502, the UE 310 reports the audibility of an NR cell with a value $NR_C$ for the NR PCI. As the reported value for the NR PCI is amongst the known (i.e., listed) NR neighbor of the cell $LTE_B$ 502, the cell $LTE_B$ 502 tries to establish a secondary leg of dual connectivity for the UE 310 with the NR cell $NRC_1$, which is the NR cell indicated in the list of the cell $LTE_B$ 502. However, this DC setup attempt fails, as the one NR cell among the at least two NR cells using the value $NR_C$ for the NR PCI (i.e., the one NR cell actually heard by the UE 310) is the cell $NR_{C2}$. If the cell $LTE_B$ 502 detects this failure for the NR PCI value PCI $NR_C$ many times (e.g., on a predefined number of failures with respect to the NR cell with PCI $NR_C$), it determines the NR PCI conflict. In order to identify which are the one or more other NR cells that are causing the PCI conflict (and, optionally, in order to verify a PCI conflict indicated by statistics), the cell $LTE_B$ 502 may send request to its neighboring LTE cells, e.g., as described in the context of the first implementation of PCI conflict determination. As a result, the $LTE_B$ identifies the presence of the cell $NR_{C2}$. Based on this the cell $LTE_B$ determines the NR PCI conflict between the cell $NR_{C1}$ and the cell $NR_{C2}$, and it triggers or performs the NR PCI conflict resolution according to any implementation of the method 200.

Hereinafter, embodiments of PCI conflict resolution according to the device 100 and the method 200 are described. For example, independent of the implementation of the PCI conflict determination, the PCI conflict may be resolved or mitigated according to a first embodiment described with reference to FIGS. 13 and 14 and/or according to a second embodiment described with reference to FIG. 15.

Once the PCI conflict is determined for one or more (e.g., listed) NR cells, the LTE cell (e.g., the LTE master cell of a DC) may trigger or perform any one or different implementations of the methods 200 for resolving the determined PCI conflict.

Herein, referring to "PCI" for brevity in the context of a second cell may encompass a PCI according to the second RAT. For example, referring to "PCI" for brevity in the context of an NR cell may encompass an NR PCI.

A comparative example for the PCI conflict resolution, which may be combined with the method 200 and/or selectively performed, reassigns a different PCI to NR cells. The comparative example may be applied in the scenario depicted in FIG. 7. Once the $LTE_B$ determines the PCI conflict, it requests one or both of the cell $NR_{C1}$ and the cell $NR_{C2}$ to reset its PCI to a different value. In a variant of the comparative example, this request is sent via another RAN and/or a core network node (e.g., the MME).

The comparative example for the PCI conflict resolution via PCI reassignment in NR may be applied in some of the scenarios illustrated in FIGS. 5, 7 and 8 under certain conditions. However, in some other scenarios or under more general conditions, e.g., in a RAN deployed or organized by more than one vendor (e.g., as in the scenario shown in FIG. 11), the PCI reassignment may be much harder or impossible, e.g., to reassign the PCI of an NR node of a different vendor. Also, in a scenario involving many and/or dense NR nodes (e.g., as shown in FIG. 12), it may be impossible to find enough unallocated, collision-free PCIs to be assigned to the NR nodes. Moreover, also in the scenarios of FIG. 5 and FIG. 8, if the NR nodes (i.e., the cells $NR_{C1}$ and $NR_{C2}$) belong to different vendors, it will be difficult or impossible to reset the NR PCIs, which may require additional procedures.

A first embodiment of the device 100 and the method 200 uses CSI-RS resources for the measurement signal. An example of the first embodiment is described with reference to the signaling diagram 600 in FIG. 13. For clarity and without limitation thereto, the cells referred to in the signaling diagram 600 in FIG. 13 may correspond to the exemplary deployment of the network 300 in FIG. 5.

The UE 310 is dual-connected to the cell $LTE_A$ 100 and the cell $NR_B$ 312. The LTE cell $LTE_A$ 100 has received the IP and/or TNL addresses of the cells $NR_{C1}$ and $NR_{C2}$ (e.g., as a result of the first implementation of the PCI conflict determination). The cell $LTE_A$ 100 has determined the PCI conflict in NR for the corresponding PCI value $NR_C$.

In one variant, the LTE cell $LTE_A$ 100 requests its neighboring LTE cells $LTE_B$ 502 and $LTE_C$ 504, each of which responded to the previously requested NR cell $NR_C$-identification (e.g., those LTE cells that respond in the step 8 of FIG. 6), to transmit a CSI-RS in the step "1." as an implementation of the step 202. The LTE cells $LTE_B$ 502 and $LTE_C$ 504 send (e.g., forward) the CSI-RS configuration of the cell $NR_{C1}$ 512 and the cell $NR_{C2}$ 514 to the $LTE_A$ 100, as indicated at step "2." in FIG. 13. The cell $LTE_B$ 502 and the cell $LTE_C$ 504 may obtain the CSI-RS configuration based on previous configurations of the respectively associated cells $NR_{C1}$ 512 and $NR_{C2}$ 514, or they may explicitly request the cells $NR_{C1}$ 512 and $NR_{C2}$ 514 to inform the same.

Optionally, the cells $LTE_B$ 502 and $LTE_C$ 504 request the cells $NR_{C1}$ 512 and $NR_{C2}$ 514 to transmit the corresponding CSI-RSs (step 3 in FIG. 13) if these NR cells are not doing so already.

In another variant, instead of requesting the cells $LTE_B$ 502 and $LTE_C$ 504 for the CSI-RS configurations of the cells $NR_{C1}$ 512 and $NR_{C2}$ 514, the cell $LTE_A$ 100 may directly request the cells $NR_{C1}$ 512 and $NR_{C2}$ 514 for the CSI-RS configurations and/or may request the cells NRC1 512 and NRC2 514 to transmit the CSI-RSs directly (e.g., via an S1 connection or after establishing a temporary neighbor relation via $X_2$ setup, with $NR_{C1}$ and $NR_{C2}$).

In any variant, the request for the transmission of the CSI-RSs as an example for the measurement signal may be optional if these NR cells are transmitting the CSI-RSs already. For example, the step 202 may be implemented by verifying that the measurement signal is transmitted to the UE by each of the at least two second cells (e.g., NR cells).

In any variant, the cell $LTE_A$ 100 may detect that the CSI-RS resources used by the cells $NR_{C1}$ 512 and $NR_{C2}$ 514 are the same. This can potentially cause a CSI-RS report conflict later on. The cell $LTE_A$ 100 may request for a modification of the CSI-RS resources of at least one of the NR cells (e.g., each of the at least two NR cells). Alternatively (e.g., if the one or more modifications are not possible) or in addition, the cell $LTE_A$ 100 may request for muting of the CSI-RS transmission from one of the NR cells while the other NR cell is transmitting its CSI-RSs, and later on perform vice-versa.

Figure 13:
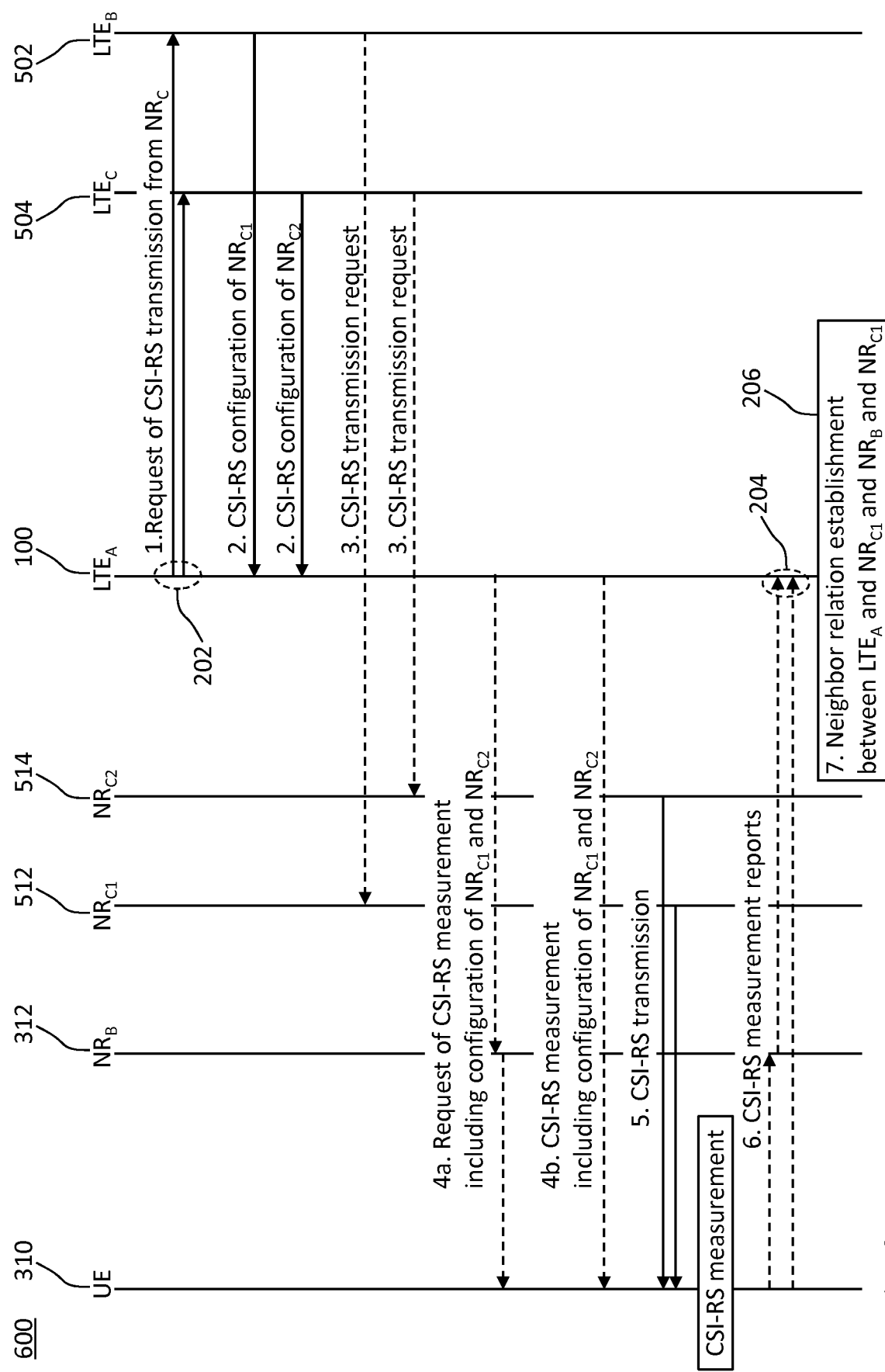
FIG. 13 schematically illustrates a fourth exemplary signaling diagram resulting from an implementation of the method of FIG. 2, which method may be implementable in the exemplary network deployment of FIG. 5.

Optionally, as a substep of the step 202, the LTE cell $LTE_A$ 100 may directly configure the UE 310 to measure on NR CSI-RS resources (as received in the step "2." in FIG. 13), which is indicated as step "4b." in FIG. 13. Alternatively or in addition, the LTE cell $LTE_A$ 100 may transmit the configuration via the cell $NR_B$ 312 to the UE, which is indicated as step "4a." in FIG. 13).

In some embodiments, the UE 310 is configured to measure the CSI-RSs transmitted from two or all of the at least two NR cells $NR_{C1}$ 512 and $NR_{C2}$ 514 at the same time. In some other embodiments, the UE 310 is configured to measure on CSI-RS resources belonging to only one of the at least two NR cell (say, the cell $NR_{C1}$ 512) and after reporting the audibility or non-audibility of these CSI-RSs according to the step 204, the UE 310 may be optionally configured with the CSI-RS resources of the other or the next NR cell (say, the cell $NR_{C2}$ 514).

The UE 310 may perform the CSI-RS measurements and report the same directly to the serving first cell, i.e., the cell $LTE_A$ 100, or via the serving second cell of the DC, i.e., the cell $NR_B$ 312 in the example of FIG. 13, these options being indicated in step "6." in FIG. 13.

Based on the CSI-RS report as an example of the confirmation report, the LTE cell 100 is able to distinguish whether the cell $NR_{C1}$ 512 or the cell $NR_{C2}$ 514 needs to be added to the neighbor list in the step 206.

Figure 14:
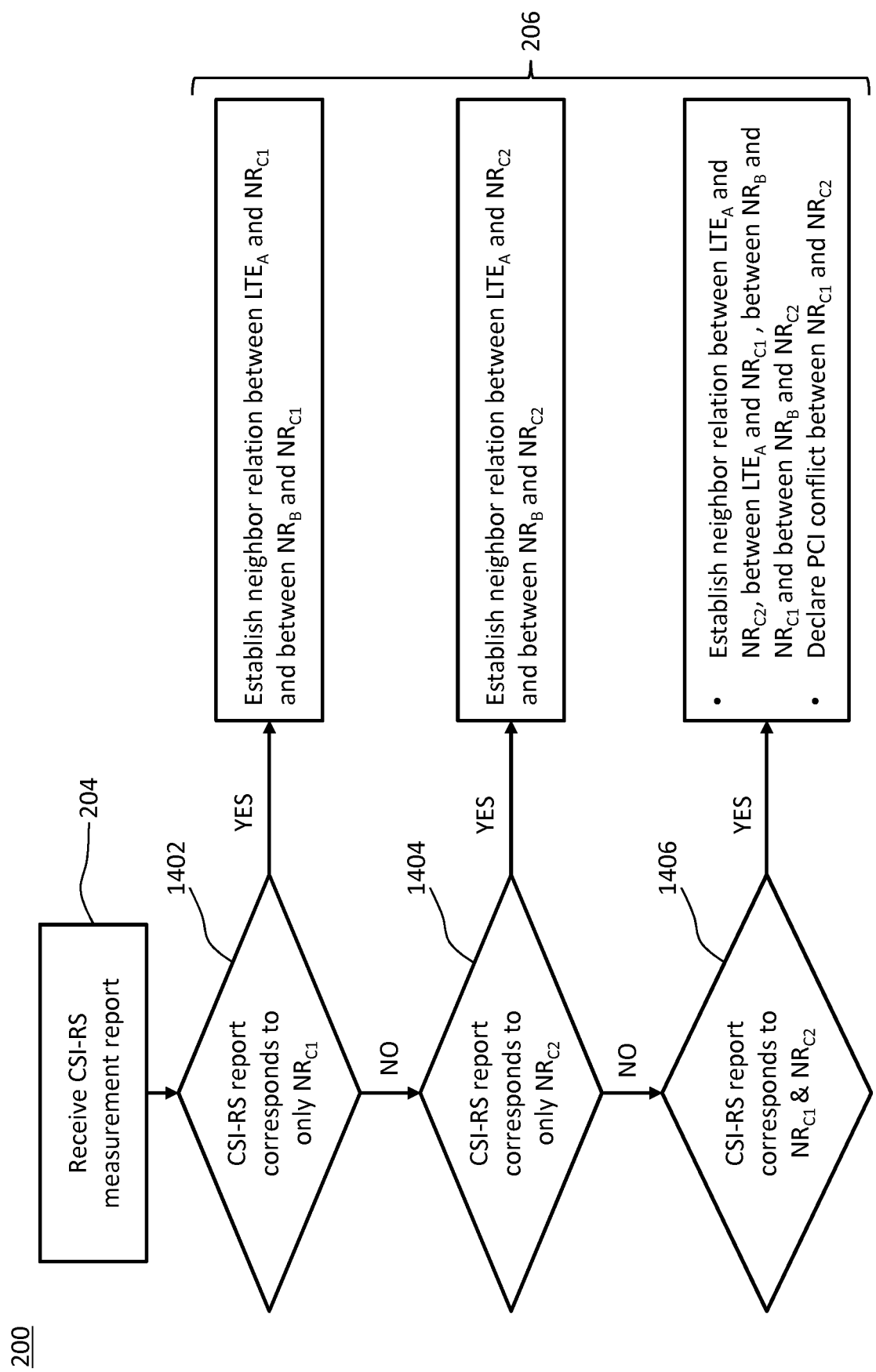
FIG. 14 shows a flowchart for an implementation of the method of FIG. 2.

FIG. 14 shows a flowchart for an exemplary implementation of the method 200. The method 200 may be implemented as a NR PCI conflict resolution using CSI-RS decision making at the LTE$_A$ 100 (e.g., according to the step "7." in FIG. 13). For example, if the UE 310 hears the CSI-RS (i.e., receives the measurement signal) corresponding to the cell NR$_{C1}$ 512, as indicated at branching point 1402, the cell LTE$_A$ 100 begins the neighbor relation establishment between the cell LTE$_A$ 100 and the cell NR$_{C1}$ 512 as well between the cell NR$_B$ 312 and the cell NR$_{C1}$ 512. If the UE 310 hears the CSI-RS corresponding to the cell NR$_{C2}$ 514, as indicated at branching point 1404, the cell LTE$_A$ 100 begins the neighbor relation establishment between the cell LTE$_A$ 100 and the cell NR$_{C2}$ 514 as well as between the cell NR$_B$ 312 and the cell NR$_{C2}$ 514. If the UE 310 hears both CSI-RSs corresponding to the cells NR$_{C1}$ 512 and the cell NR$_{C2}$ 514, as indicated at branching point 1406, the cell LTE$_A$ 100 begins the neighbor relation establishment between the cell LTE$_A$ 100 and the cell NR$_{C1}$ 512, between the cell LTE$_A$ 100 and the cell NR$_{C2}$ 514, between the cell NR$_B$ 312 and the cell NR$_{C2}$ 514 as well as between the cell NR$_B$ 312 and the cell NR$_{C1}$ 512. Moreover, in case the branching point 1406 is evaluated in the affirmative, the cell LTE$_A$ 100 determines a PCI conflict case for the cells NR$_{C1}$ 512 and NR$_{C2}$ 514.

In an example of the second embodiment, e.g., using CSI-RS as the measurement signal, a CSI-RS measurement configuration and a CSI-RS configuration are the same configuration. The CSI-RS measurement configurations may refer to the measurement configuration for CSI-RS, e.g., as provided in a MeasObjectNR in the document 3GPP TS 38.331 version 15.1.0. This configuration informs the UE 310 as to which CSI-RS is to be measured by the UE 310, radio resources to receive the CSI-RS, and/or how much is its bandwidth (BW) is to be measured, etc.

The information element (IE) MeasObjectNR may specify information applicable for measuring the measurement signal, e.g., one or more blocks comprising synchronization signals (SS) and/or a physical broadcast channel (PBCH), which may also be referred to as SSblock, SSB or SS/PBCH block, or for measuring a reference signal, e.g., the CSI-RS. The measurement may be an intra-frequency measurement and/or an inter-frequency measurement.

An example for a definition of the MeasObjectNR IE is provided below using Abstract Syntax Notation One (ASN.1 or ASN1).

```
-- ASN1START
-- TAG-MEAS-OBJECT-NR-START
[...]
CSI-RS-ResourceConfigMobility :: = SEQUENCE {
  -- MO specific values
  isServingCellMO BOOLEAN,
  -- Subcarrier spacing of CSI-RS.
  -- Only the values 15, 30 or 60 kHz (<6 GHz), 60 or 120 kHz (>6 GHz)
are applicable.
  -- Corresponds to L1 parameter 'Numerology' (see 38.211, section
FFS_Section)
  subcarrierSpacing SubcarrierSpacing,
-- List of cells
  csi-RS-CellList-Mobility SEQUENCE (SIZE (1..maxNrofCSI-RS-
CellsRRM)) OF CSI-RS-CellMobility
}
CSI-RS-CellMobility ::= SEQUENCE {
  cellId PhysCellId,
  csi-rs-MeasurementBW SEQUENCE {
    -- Allowed size of the measurement BW in PRBs
    -- Corresponds to L1 parameter 'CSI-RS-measurementBW-size' (see
FFS_Spec,
      section FFS_Section)
  nrofPRBs ENUMERATED { size24, size48, size96, size192,
size264},
    -- Starting PRB index of the measurement bandwidth
    -- Corresponds to L1 parameter 'CSI-RS-measurement-BW-start'
(see FFS_Spec,
      section FFS_Section)
    -- FFS_Value: Upper edge of value range unclear in RAN1
  startPRB INTEGER(0. . 2169)
  },
  -- Frequency domain density for the 1-port CSI-RS for L3 mobility
  -- Corresponds to L1 parameter 'Density' (see FFS_Spec, section
FFS_Section)
  Density ENUMERATED {d1,d3} OPTIONAL,
-- List of resources
  csi-rs-ResourceList-Mobility SEQUENCE (SIZE (1..maxNrofCSI-RS-
ResourcesRRM) ) OF CSI-RS-Resource-Mobility
}
CSI-RS-Resource-Mobility ::= SEQUENCE {
  csi-RS-Index CSI-RS-Index,
  -- Contains periodicity and slot offset for periodic/semi-persistent
CSI-RS (see 38.211, section x.x.x.x)FFS_Ref
  slotConfig CHOICE {
    ms4 INTEGER (0. . 31),
    ms5 INTEGER (0. . 39),
    ms10 INTEGER (0. . 79),
    ms20 INTEGER (0. . 159),
    ms40 INTEGER (0. . 319)
  },
  -- Each CSI-RS resource may be associated with one SSB. If such SSB
is indicated, the NW also indicates whether the UE may assume
  -- quasi-colocation of this SSB with this CSI-RS reosurce.
  -- Corresponds to L1 parameter 'Associated-SSB' (see FFS_Spec,
section FFS_Section)
    associatedSSB SEQUENCE {
    ssb-Index SSB-Index,
    -- The CSI-RS resource is either QCL'ed not QCL'ed with the
associated SSB in spatial parameters
    -- Corresponds to L1 parameter 'QCLed-SSB' (see FFS_Spec, section
FFS_Section)
    isQuasiColocated BOOLEAN
    } OPTIONAL, -- Cond AssociatedSSB
  -- Frequency domain allocation within a physical resource block in
accordance with 38.211, section 7.4.1.5.3 including table 7.4.1.5.2-1.
  -- The number of bits that may be set to one depend on the chosen row
in that table. For the choice "other", the row can be determined from
  -- the parameters below and from the number of bits set to 1 in
frequencyDomainAllocation.
    frequencyDomainAllocation CHOICE {
      row1 BIT STRING (SIZE (4)),
      row2 BIT STRING (SIZE (12) )
    },
    -- Time domain allocation within a physical resource block. The field
indicates the first OFDM symbol in the PRB used for CSI-RS.
    -- Parameter l$_0$ in 38.211, section 7.4.1.5.3. Value 2 is supported
only when DL-DMRS-typeA-pos equals 3.
    firstOFDMSymbolInTimeDomain INTEGER (0. . 13),
    -- Scrambling ID for CSI-RS(see 38.211, section 7.4.1.5.2)
    sequenceGenerationConfig INTEGER (0. . 1023),
  [...]
  }
CSI-RS-Index :: = INTEGER (0..maxNrofCSI-RS-ResourcesRRM-
1)
[...]
-- TAG-MEAS-OBJECT-NR-STOP
-- ASN1STOP
```

The step 202 (e.g., at the step "1." in FIG. 13) may comprise a "Request of CSI-RS transmission" or a "Request of CSI-RS measurement configuration", which is an inter-node communication between the LTE node embodying the device 100 and its neighboring LTE nodes. The request may be transmitted from the (original) source cell, which requests the neighboring LTE cells to inform which CSI-RSs correspond to the NR nodes 512 and 514 with a specific PCI (i.e., NR$_C$ in the example). The (original) source cell may be the cell NR$_B$ 312 in one variant or the NR$_B$ 312 informs the cell LTE$_A$ 100, which functions as the source cell, in another variant.

The "CSI-RS transmission request" is the request message from neighboring LTE cell to its known or associated neighbor NR cells with the specific PCI (i.e., $NR_C$ in the example) to start the CSI-RS transmissions. Once a NR cell (e.g., 512 and 514) receives this request, it starts the transmission of the CSI-RSs, which are mentioned in the request message or all the CSI-RS that the respective NR cell is configured to transmit.

The "CSI-RS measurement report" is an example of the confirmation report or a trigger of the confirmation report. The "CSI-RS measurement report" may be comprised in the MeasResults IE according to the document 3GPP TS 38.331, version 15.1.0.

The MeasResults IE may comprise measured results for intra-frequency, inter-frequency and/or inter-RAT mobility.

An example for a definition of the MeasResults IE is provided below using Abstract Syntax Notation One (ASN.1 or ASN1).

```
-- ASN1START
-- TAG-MEAS-RESULTS-START
[...]
MeasResultNR ::= SEQUENCE {
    [...]
    measResult SEQUENCE {
        cellResults SEQUENCE{
            [...]
            resultsCSI-RS-Cell MeasQuantityResults
    OPTIONAL
        },
        rsIndexResults SEQUENCE{
            [...]
            resultsCSI-RS-Indexes ResultsPerCSI-RS-IndexList
    OPTIONAL
        } OPTIONAL
    },
    [...]
}
[...]
ResultsPerCSI-RS-IndexList :: = SEQUENCE (SIZE
(1..maxNrofCSI-RS) ) OF
ResultsPerCSI-RS-Index
ResultsPerCSI-RS-Index :: = SEQUENCE {
    csi-RS-Index CSI-RS-Index,
    csi-RS-Results MeasQuantityResults
    OPTIONAL
}
-- TAG-MEAS-RESULTS-STOP
-- ASN1STOP
```

Figure 15:
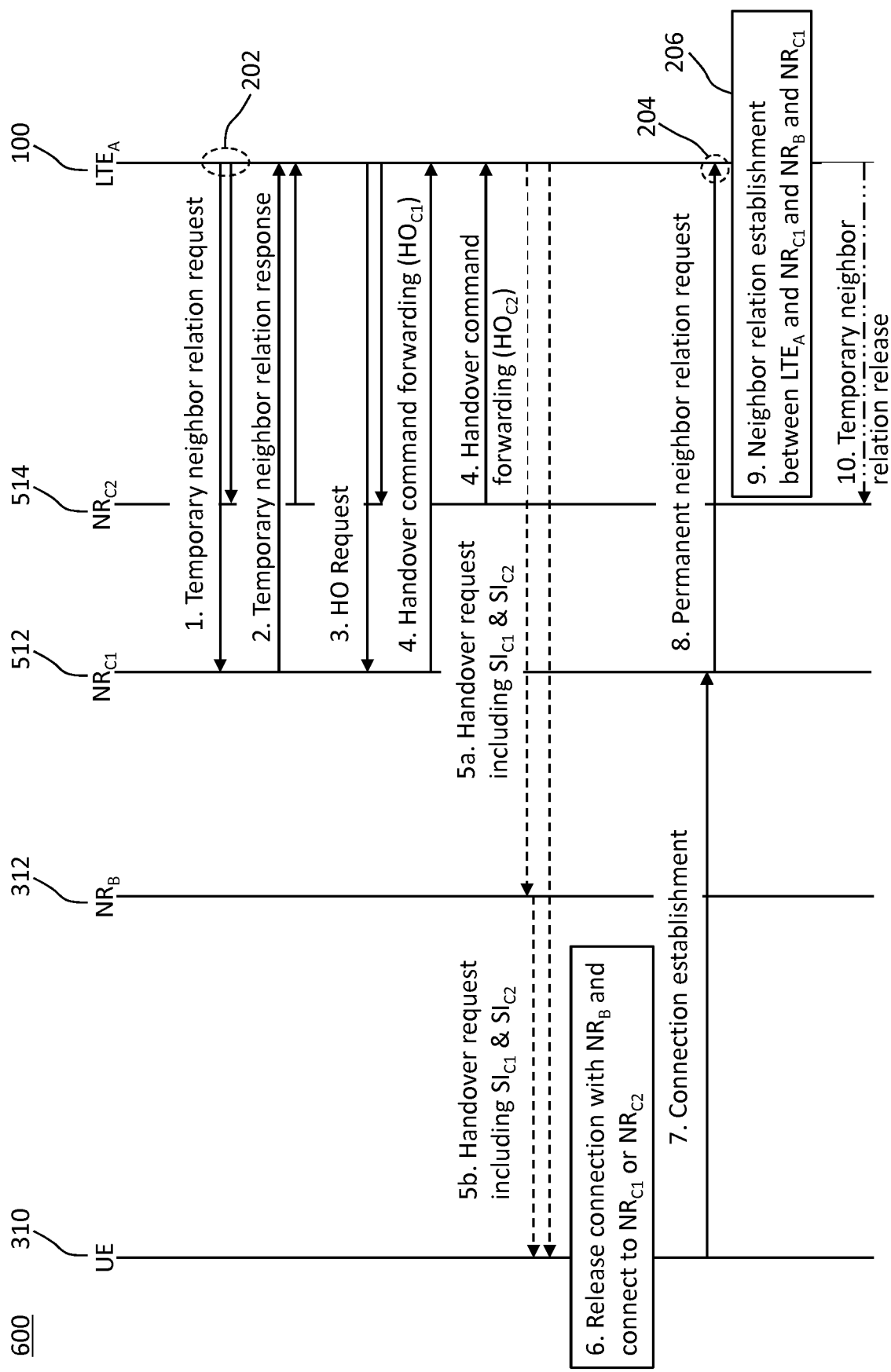
FIG. 15 schematically illustrates a fifth exemplary signaling diagram resulting from an implementation of the method of FIG. 2.

A second embodiment may use the measurement signal (e.g., a synchronization signal) in the context of a forced handover. This embodiment is exemplified in the signal flow graph 600 as shown in FIG. 15. The LTE cell (e.g., $LTE_A$) that embodies the device 100 requests the cells $NR_{C1}$ 512 and $NR_{C2}$ 514 for establishing a temporary neighbor relation with the at least two second cells (e.g., the cells $NR_{C1}$ 512 and $NR_{C2}$ 514), respectively, as indicated at the step "1." in FIG. 15).

Herein, a "temporary neighbor relation" may encompass establishing an interface (e.g., X2 and/or Xn interface) between the serving LTE cell 100 (e.g., the cell $LTE_A$) and each of the at least two second cells (e.g., the cells $NR_{C1}$ 512 and $NR_{C2}$ 514). Alternatively or in addition, a "temporary neighbor relation" may encompass an inter-node communication link via one or more intermediate nodes (e.g., first nodes). The nodes in the "temporary neighbor relation" may be configured to exchange the inter-nodal information required to resolve PCI conflicts according to any embodiment of the device 100 and the method 200.

Using the temporary neighbor relation, a message from the cell $LTE_A$ 100 may inform, or upon establishing the temporary neighbor relation, the request from the cell $LTE_A$ 100 for the temporary neighbor relation may inform the at least two NR cells 512 and 514 that the purpose of this setup is to resolve a PCI conflict in NR cells.

As an implementation of the step 202, e.g., once the temporary neighbor relationship is established, the LTE cell 100 (e.g., $LTE_A$) and/or an NR cell 312 associated with the LTE cell 100 (e.g., $NR_B$) requests for a handover of the UE 310 (e.g., as indicated at step "3." in FIG. 15). Once the handover command is obtained (e.g., as indicated at step "4." in FIG. 15), the cell $LTE_A$ 100 may initiate a forced (e.g., intra-frequency) handover in NR to resolve the PCI conflict. The handover command may include the system information (SI) for accessing the at least two NR cells (as target cells), respectively, e.g., as indicated at step "5a." or "5b." in FIG. 15.

In one example of this method 200, the cell $LTE_A$ 100 (or in a variant the associated cell $NR_B$ 312 may perform this configuration) configures the UE 310 by sending a handover command (e.g., in the NR leg of a dual connectivity). The handover command, or a message comprising said command, also comprises the SI of each of the at least two second cells, e.g., of both the cell $NR_{C1}$ 512 and the cell $NR_{C2}$ 514. Optionally, the UE 310 may be informed as to which of the at least two cells it is to radio-access first, e.g., $NR_{C1}$ or $NR_{C2}$, using the same release and redirect message. Alternatively, the UE 310 chooses the order of radio access on its own.

In another example of this method 200, the cell $LTE_A$ 100 (or in a variant the associated cell $NR_B$ 312 may perform this configuration) configures the UE 310 by sending a handover command (e.g., in the NR leg of a dual connectivity). The handover command, or a message comprising said command, also comprises the SI of one of the at least two second cells, e.g., of the cell $NR_{C1}$ 512 or the cell $NR_{C2}$ 514. In this variant, if the UE 310 fails to access the $NR_C$ cell, then the cell $LTE_A$ 100 reconfigures the UE 310 by sending a handover command message with SI of the other or the next of the at least two second cells (i.e., the other or next cell also using the NR PCI value $NR_C$).

Based on the available SI of the at least two NR cells, the UE 310 tries to access the $NR_C$-cells. The one of the at least two $NR_C$-cell that receives the UE 310 informs the cell $LTE_A$ 100 that the neighbor relation establishment can be confirmed from its side, which is an example of the confirmation report, as the UE 310 has access to it. In the signaling diagram 600 in FIG. 15, it is the cell $NR_{C1}$ 512 that receives the UE 310 and informs the cell $LTE_A$ 100 by means of the confirmation report about the neighbor relation establishment. In addition, the LTE cell 100 may remove the temporary neighbor relation established with any other cell for this purpose, which is indicated as step "10." in FIG. 15.

While the second embodiment of the device 100 and the method 200 has been described with reference to FIG. 15 for a forced handover, the method 200 may be implemented requesting any SCG change or any reconfiguration with sync, e.g., instead of requesting the handover at the step "5a." or "5b.".

Furthermore, while determining the PCI conflict (particularly with reference to FIGS. 5 to 12) and resolving the PCI conflict (particularly according to the first and second embodiments of the device 100 and the method 200) have been described for two second cell (e.g., NR cells 512 and 514) causing the PCI conflict, any of these procedures may be performed for more than two second cells using the identical PCI (e.g., more than two NR$_C$-cells) in the neighborhood of the one or more serving cells 100 (and optionally 312). For example, the signal graphs 600 show only two LTE cells responding to the request from LTE$_A$ (e.g., in step "8." in FIG. 6), but the technique may be realized for the case of having more than two such LTE cells reporting as to respectively associated NR cells.

Moreover, the first and second embodiments, e.g., as described with reference to the FIG. 13 and FIG. 15, may also be used as a validation procedure after the neighbor relation is established using any embodiment of the NR PCI-based ANR function.

Figure 16:
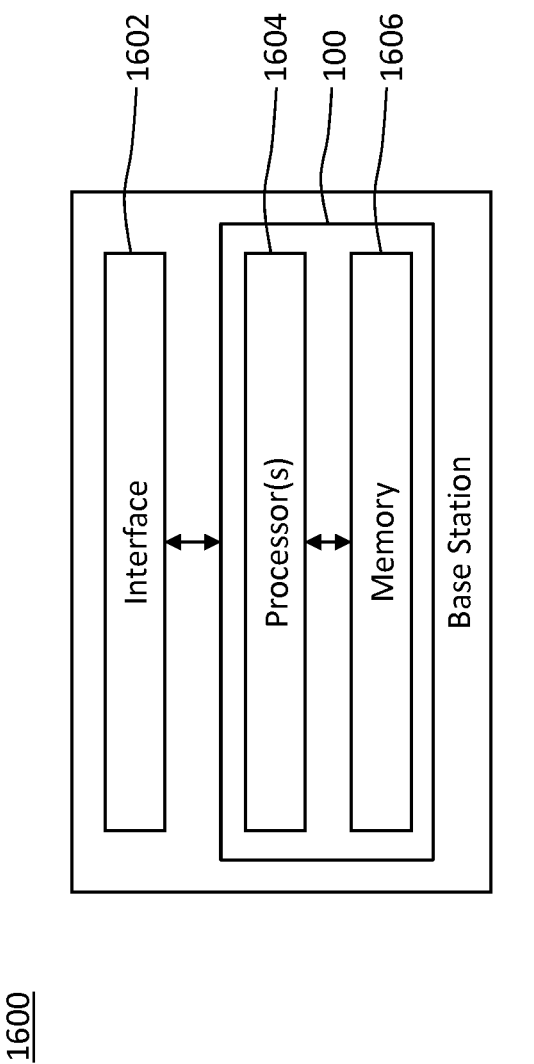
FIG. 16 shows a schematic block diagram of a base station embodiment of the device of FIG. 1.

FIG. 16 shows a schematic block diagram for an embodiment of the device 100. The device 100 comprises one or more processors 1604 for performing the method 200 and memory 706 coupled to the processors 1604. For example, the memory 1606 may be encoded with instructions that implement at least one of the modules 102, 104 and 106.

The one or more processors 1604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1606, base station functionality and/or access point functionality. For example, the one or more processors 1604 may execute instructions stored in the memory 1606. Such functionality may include providing various features and steps discussed herein, including any of the benefits disclosed herein. The expression "the device being operative to perform an action" may denote the device 100 being configured to perform the action.

As schematically illustrated in FIG. 16, the device 100 may be embodied by a base station 1600. The base station 1600 comprises a radio interface 1602 coupled to the device 100 for radio communication with one or more radio devices and/or one or more base stations.

Figure 17:
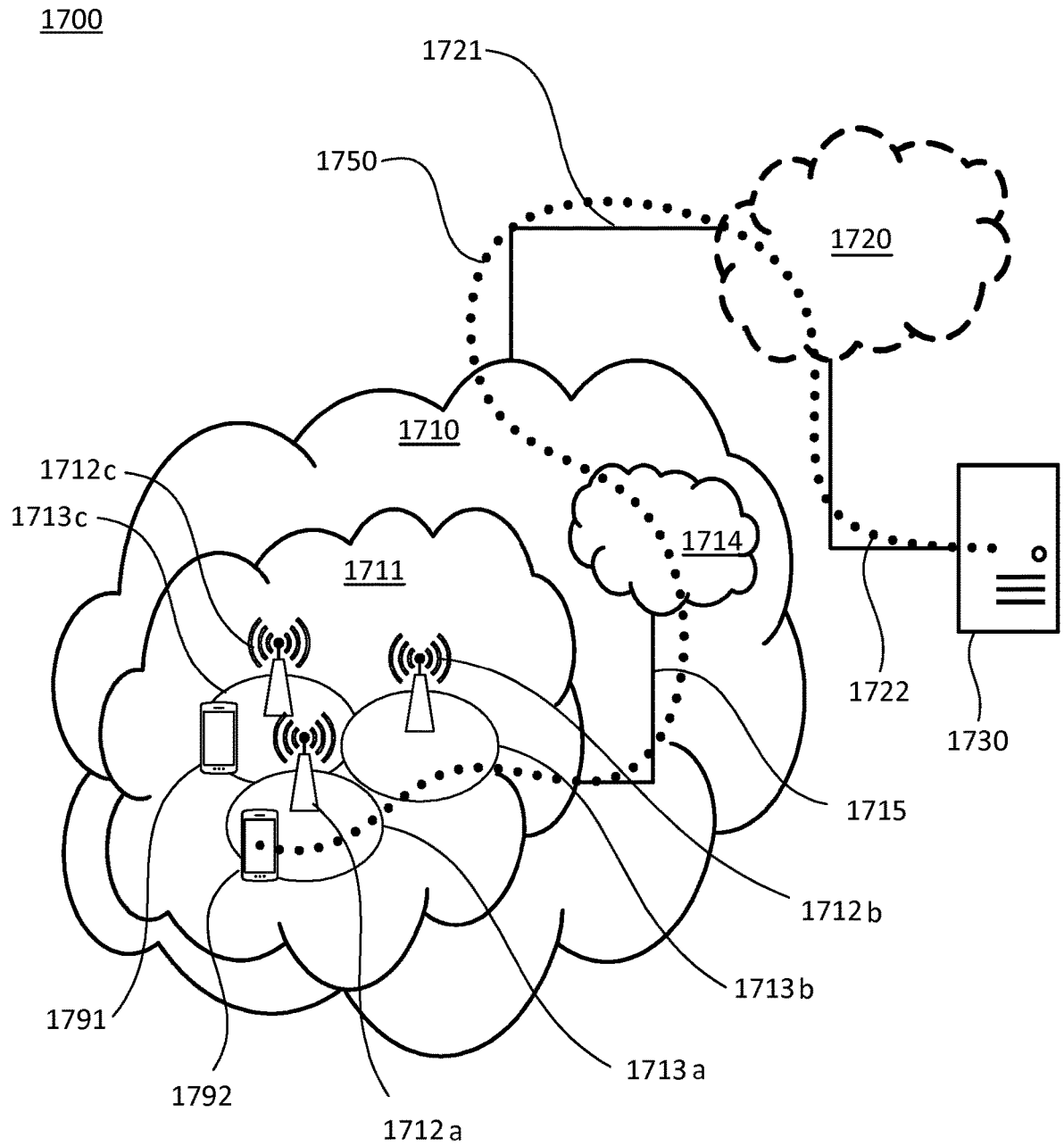
FIG. 17 schematically illustrates a telecommunication network connected via an intermediate network to a host computer.

With reference to FIG. 17, in accordance with an embodiment, a communication system 1700 includes a telecommunication network 1710, such as a 3GPP-type cellular network, which comprises an access network 1711, such as a radio access network, and a core network 1714. The access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to the core network 1714 over a wired or wireless connection 1715. A first user equipment (UE) 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

The telecommunication network 1710 is itself connected to a host computer 1730, which may be embodied in the hardware and/or software of a standalone server, a cloud-implemented server, a distributed server or as processing resources in a server farm. The host computer 1730 may be under the ownership or control of a service provider, or may be operated by the service provider or on behalf of the service provider. The connections 1721, 1722 between the telecommunication network 1710 and the host computer 1730 may extend directly from the core network 1714 to the host computer 1730 or may go via an optional intermediate network 1720. The intermediate network 1720 may be one of, or a combination of more than one of, a public, private or hosted network; the intermediate network 1720, if any, may be a backbone network or the Internet; in particular, the intermediate network 1720 may comprise two or more sub-networks (not shown).

The communication system 1700 of FIG. 17 as a whole enables connectivity between one of the connected UEs 1791, 1792 and the host computer 1730. The connectivity may be described as an over-the-top (OTT) connection 1750. The host computer 1730 and the connected UEs 1791, 1792 are configured to communicate data and/or signaling via the OTT connection 1750, using the access network 1711, the core network 1714, any intermediate network 1720 and possible further infrastructure (not shown) as intermediaries. The OTT connection 1750 may be transparent in the sense that the participating communication devices through which the OTT connection 1750 passes are unaware of routing of uplink and downlink communications. For example, a base station 1712 may not or need not be informed about the past routing of an incoming downlink communication with data originating from a host computer 1730 to be forwarded (e.g., handed over) to a connected UE 1791. Similarly, the base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In a communication system 1800, a host computer 1810 comprises hardware 1815 including a communication interface 1816 configured to set up and maintain a wired or wireless connection with an interface of a different communication device of the communication system 1800. The host computer 1810 further comprises processing circuitry 1818, which may have storage and/or processing capabilities. In particular, the processing circuitry 1818 may comprise one or more programmable processors, application-specific integrated circuits, field programmable gate arrays or combinations of these (not shown) adapted to execute instructions. The host computer 1810 further comprises software 1811, which is stored in or accessible by the host computer 1810 and executable by the processing circuitry 1818. The software 1811 includes a host application 1812. The host application 1812 may be operable to provide a service to a remote user, such as a UE 1830 connecting via an OTT connection 1850 terminating at the UE 1830 and the host computer 1810. In providing the service to the remote user, the host application 1812 may provide user data which is transmitted using the OTT connection 1850.

The communication system 1800 further includes a base station 1820 provided in a telecommunication system and comprising hardware 1825 enabling it to communicate with the host computer 1810 and with the UE 1830. The hardware 1825 may include a communication interface 1826 for setting up and maintaining a wired or wireless connection with an interface of a different communication device of the communication system 1800, as well as a radio interface 1827 for setting up and maintaining at least a wireless connection 1870 with a UE 1830 located in a coverage area (not shown in FIG. 18) served by the base station 1820. The communication interface 1826 may be configured to facilitate a connection 1860 to the host computer 1810. The connection 1860 may be direct or it may pass through a core network (not shown in FIG. 18) of the telecommunication system and/or through one or more intermediate networks outside the telecommunication system. In the embodiment shown, the hardware 1825 of the base station 1820 further includes processing circuitry 1828, which may comprise one or more programmable processors, application-specific integrated circuits, field programmable gate arrays or combinations of these (not shown) adapted to execute instructions. The base station 1820 further has software 1821 stored internally or accessible via an external connection.

The communication system 1800 further includes the UE 1830 already referred to. Its hardware 1835 may include a radio interface 1837 configured to set up and maintain a wireless connection 1870 with a base station serving a coverage area in which the UE 1830 is currently located. The hardware 1835 of the UE 1830 further includes processing circuitry 1838, which may comprise one or more programmable processors, application-specific integrated circuits, field programmable gate arrays or combinations of these (not shown) adapted to execute instructions. The UE 1830 further comprises software 1831, which is stored in or accessible by the UE 1830 and executable by the processing circuitry 1838. The software 1831 includes a client application 1832. The client application 1832 may be operable to provide a service to a human or non-human user via the UE 1830, with the support of the host computer 1810. In the host computer 1810, an executing host application 1812 may communicate with the executing client application 1832 via the OTT connection 1850 terminating at the UE 1830 and the host computer 1810. In providing the service to the user, the client application 1832 may receive request data from the host application 1812 and provide user data in response to the request data. The OTT connection 1850 may transfer both the request data and the user data. The client application 1832 may interact with the user to generate the user data that it provides.

Figure 18:
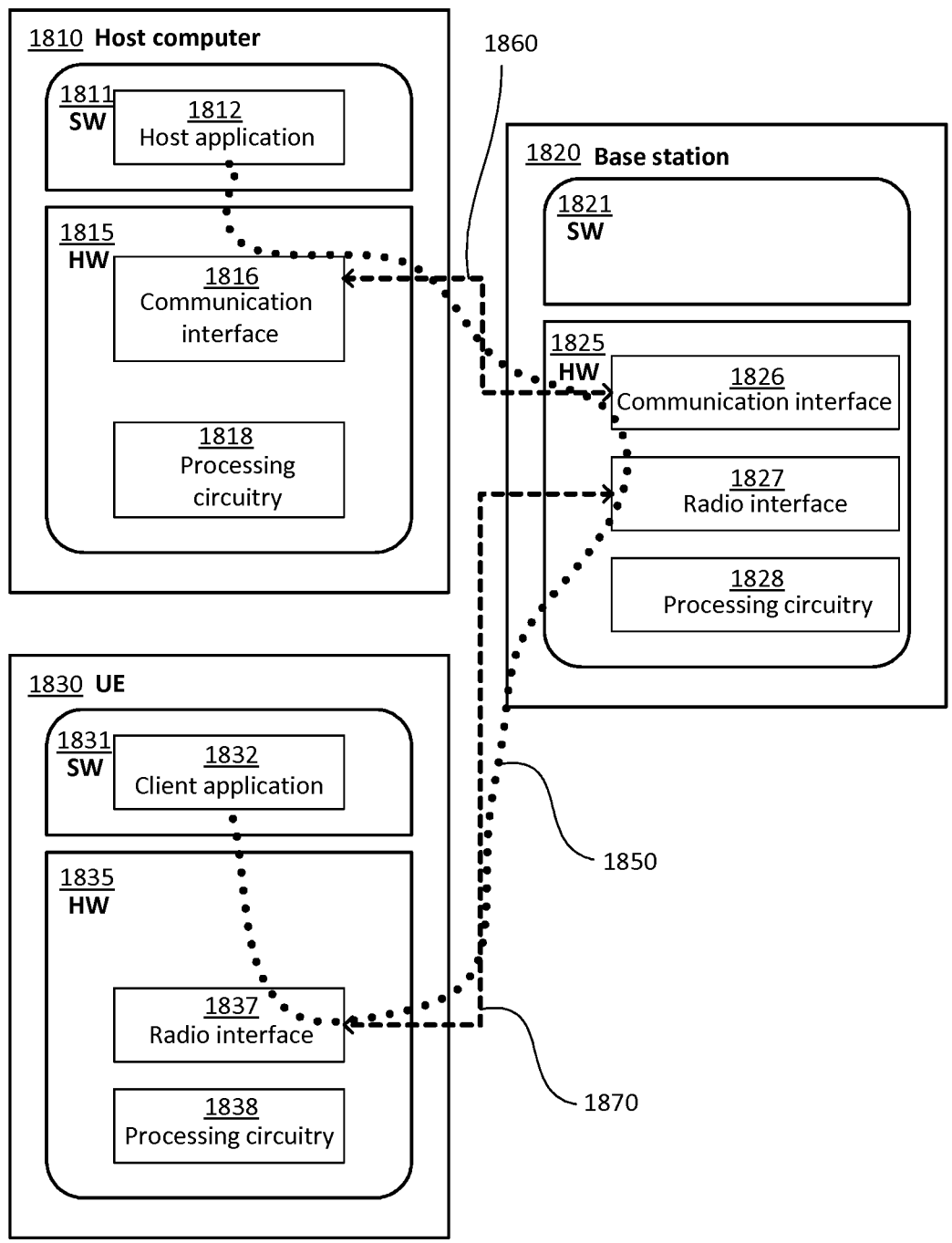
FIG. 18 shows a generalized block diagram of a host computer communicating via a base station with a user equipment over a partially wireless connection.

It is noted that the host computer 1810, base station 1820 and UE 1830 illustrated in FIG. 18 may be identical to the host computer 1730, one of the base stations 1712*a*, 1712*b*, 1712*c* and one of the UEs 1791, 1792 of FIG. 17, respectively. This is to say, the inner workings of these entities may be as shown in FIG. 18 and independently, the surrounding network topology may be that of FIG. 17.

In FIG. 18, the OTT connection 1850 has been drawn abstractly to illustrate the communication between the host computer 1810 and the use equipment 1830 via the base station 1820, without explicit reference to any intermediary devices and the precise routing of messages via these devices. Network infrastructure may determine the routing, which it may be configured to hide from the UE 1830 or from the service provider operating the host computer 1810, or both. While the OTT connection 1850 is active, the network infrastructure may further take decisions by which it dynamically changes the routing (e.g., on the basis of load balancing consideration or reconfiguration of the network).

The wireless connection 1870 between the UE 1830 and the base station 1820 is in accordance with the teachings of the embodiments described throughout this disclosure. One or more of the various embodiments improve the performance of OTT services provided to the UE 1830 using the OTT connection 1850, in which the wireless connection 1870 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1850 between the host computer 1810 and UE 1830, in response to variations in the measurement results. The measurement procedure and/or the network functionality for reconfiguring the OTT connection 1850 may be implemented in the software 1811 of the host computer 1810 or in the software 1831 of the UE 1830, or both. In embodiments, sensors (not shown) may be deployed in or in association with communication devices through which the OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of the OTT connection 1850 may include message format, retransmission settings, preferred routing etc.; the reconfiguring need not affect the base station 1820, and it may be unknown or imperceptible to the base station 1820. Such procedures and functionalities may be known and practiced in the art. In certain embodiments, measurements may involve proprietary UE signaling facilitating the host computer's 1810 measurements of throughput, propagation times, latency and the like. The measurements may be implemented in that the software 1811, 1831 causes messages to be transmitted, in particular empty or "dummy" messages, using the OTT connection 1850 while it monitors propagation times, errors etc.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In a first step 1910 of the method, the host computer provides user data. In an optional substep 1911 of the first step 1910, the host computer provides the user data by executing a host application. In a second step 1920, the host computer initiates a transmission carrying the user data to the UE. In an optional third step 1930, the base station transmits to the UE the user data which was carried in the transmission that the host computer initiated, in accordance with the teachings of the embodiments described throughout this disclosure. In an optional fourth step 1940, the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In a first step 2010 of the method, the host computer provides user data. In an optional substep (not shown) the host computer provides the user data by executing a host application. In a second step 2020, the host computer initiates a transmission carrying the user data to the UE. The transmission may pass via the base station, in accordance with the teachings of the embodiments described throughout this disclosure. In an optional third step 2030, the UE receives the user data carried in the transmission.

As has become apparent from above description, embodiments of the technique can determine and/or resolve a conflict in the cell identifiers (e.g., physical cell identifiers or PCIs) used by a second RAT. The conflict may occur from the perspective of a first RAT that functions a backbone for the second RAT. Same or further embodiments can support an automatic establishment of neighbor relation (e.g., an ANR function) between second cells that provide radio access according to the second RAT, particularly non-stand-alone (NSA) New Radio (NR) nodes.

Same or further embodiments can may resolve the PCI conflict without causing additional overhead by transmitting system information (SI) from the NSA NR nodes and without wasting any random access resources (e.g., PRACH resources). Particularly, at least some embodiments do not need to reserve PRACH resources exclusively for an ANR function in NSA deployments.

Same or further embodiments can utilize an NR PCI-based ANR function by resolving any NR PCI conflict while establishing neighbor relation between NR cells using the NR PCI-based ANR function.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of updating a list of neighbor relations between cells of a radio access network, RAN, the cells of the RAN comprising first cells configured to provide radio access according to a first radio access technology, RAT, and second cells configured to provide radio access according to a second RAT that is different from the first RAT, the method comprising the steps of:
   initiating each of at least two of the second cells of the RAN to transmit a measurement signal to a radio device that is served by one or more cells of the RAN other than the at least two second cells of the RAN;
   receiving a confirmation report indicative of a reception of the measurement signal at the radio device from one second cell among the at least two second cells; and
   updating the list of neighbor relations according to the received confirmation report.

2. The method of claim 1, wherein the step of updating the list comprises or is implemented by:
   including, in the list, a neighbor relation between the one second cell and at least one of the one or more serving cells.

3. The method of claim 1, wherein the step of updating the list comprises or is implemented by:
   excluding, from the list, a neighbor relation between at least one of the one or more serving cells and another one of the at least two second cells other than the one second cell from which the measurement signal is received at the radio device.

4. The method of claim 1 wherein the measurement signal comprises at least one of a reference signal, RS, and a synchronization signal, SS, particularly a channel state information RS, CSI-RS, or a SS block, SSB.

5. The method of claim 1 wherein the step of initiating the transmission of the measurement signals comprises or is implemented by:
   sending a RAN control message to each of the at least two second cells, the RAN control message triggering the respective second cell to transmit the measurement signal.

6. The method of claim 5, wherein at least one or each of the at least two RAN control messages is transmitted to the respective second cell via a first cell of the RAN (304) that is a neighboring cell of the respective second cell.

7. The method of claim 5, wherein each of the RAN control messages comprises a request for a handover to the respective second cell or a request for adding the respective second cell to a secondary cell group, SCG.

8. The method of claim 1, wherein the step of initiating the transmission of the measurement signals comprises or is implemented by:
   transmitting a radio resource control, RRC, message to the radio device, the RRC message configuring the radio device to measure the measurement signal according to a measurement configuration of the one or more serving cells and/or according to a resource configuration of each of the at least two second cells.

9. The method of claim 1, wherein the confirmation report comprises or is implemented by a measurement report indicative of a result of a measurement of the measurement signal at the radio device, and/or wherein the confirmation report is selectively transmitted depending on a result of the measurement of the measurement signal at the radio device.

10. The method of claim 1, wherein the step of initiating the transmission of the measurement signals comprises or is implemented by:
    transmitting a radio resource control, RRC, message to the radio device, the RRC message configuring the radio device to transmit a random access, RA, preamble to the one second cell responsive to the reception of the measurement signal at the radio device from the one second cell.

11. The method of claim 10, wherein a radio resource used for the transmission of the RA preamble to the one second cell depends on the measurement signal received at the radio device from the one second cell.

12. The method of claim 10, wherein the RRC message is indicative of resources for the transmission of the RA preamble for each of the at least two second cells.

13. The method of claim 10, wherein the RRC message is, for each of the at least two second cells, indicative of an association between the measurement signal from the respective second cell and one or more RA occasions for the transmission of the RA preamble to respective second cell if the measurement signal is received from the respective second cell.

14. The method of claim 10, wherein the confirmation report is received from the one second cell, the confirmation report being indicative of the reception of the measurement signal at the radio device by being indicative of reception of the RA preamble at the one second cell from the radio device or by being indicative of completion of a RA procedure at the one second cell with the radio device.

15. The method of claim 1, further comprising the step of:
    determining that the at least two second cells use identical physical cell identifiers, PCIs, wherein the transmission of the measurement signal is initiated responsive to the determination.

16. The method of claim 15, wherein the determination of the at least two second cells comprises the steps of:
    sending a request to one, two or more first cells neighboring the one or more serving cells, the request being indicative of a PCI; and
    receiving responses from one, two or more of the requested first cells, the responses being indicative of the at least two second cells using the identical PCI indicated in the request.

17. The method of claim 15, wherein the determination of the at least two second cells comprises determining the identical PCI among second cells associated with the one or more serving cells and/or second cells indicated in the responses from the neighboring first cells.

18. The method of claim 15, wherein the determination of the at least two second cells comprises the step of:
   determining the identical PCI based on statistics of failed handovers involving a second cell using the identical PCI and/or failed dual connectivity establishments involving a second cell using the identical PCI.

19. The method of claim 15, wherein the second cells of the RAN transmit synchronization signals that are indicative of respectively used PCIs, wherein the second cells with overlapping coverage area use different PCIs.

20. The method of claim 19, wherein the at least two second cells using the identical PCI are associated with the one or more serving cells and/or with one, two or more of the first cells neighboring the one or more serving cells.

21. The method of claim 1, wherein the method is performed by a first cell of the RAN that is serving the radio device.

22. The method of claim 1, wherein the measurement signal is cell-specific for the respective one of the at least two second cells.

23. The method of claim 1, wherein the one or more serving cells comprise one of the first cells, which is serving the radio device in a single connectivity mode.

24. The method of claim 1, wherein the one or more serving cells comprise one of the first cells and one of the second cells, which are serving the radio device in a dual connectivity mode.

25. A base station configured to communicate with a UE, the base station comprising a radio interface and processing circuitry configured to execute the steps of claim 1.

26. A device for updating a list of neighbor relations between cells of a radio access network, RAN, the cells of the RAN comprising first cells configured to provide radio access according to a first radio access technology, RAT, and second cells configured to provide radio access according to a second RAT that is different from the first RAT, the device comprising at least one processor and a memory, said memory comprising instructions executable by said at least one processor, whereby the device is operative to:
   initiate each of at least two of the second cells of the RAN to transmit a measurement signal to a radio device that is served by one or more cells of the RAN other than the at least two second cells of the RAN;
   receive a confirmation report indicative of a reception of the measurement signal at the radio device from one second cell among the at least two second cells; and
   update the list of neighbor relations according to the received confirmation report.

\* \* \* \* \*